(12) United States Patent
Miyazaki

(10) Patent No.: US 8,611,676 B2
(45) Date of Patent: Dec. 17, 2013

(54) INFORMATION PROCESSING APPARATUS, FEATURE EXTRACTION METHOD, RECORDING MEDIA, AND PROGRAM

(75) Inventor: Mitsuhiro Miyazaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 1338 days.

(21) Appl. No.: 11/662,250

(22) PCT Filed: Jul. 24, 2006

(86) PCT No.: PCT/JP2006/014558
§ 371 (c)(1),
(2), (4) Date: Mar. 13, 2008

(87) PCT Pub. No.: WO2007/013390
PCT Pub. Date: Feb. 1, 2007

(65) Prior Publication Data
US 2008/0260253 A1 Oct. 23, 2008

(30) Foreign Application Priority Data

Jul. 26, 2005 (JP) ............................... P2005-215906
Jun. 12, 2006 (JP) ............................... P2006-162419

(51) Int. Cl.
*G06K 9/00* (2006.01)

(52) U.S. Cl.
USPC .......................................... 382/224; 382/181

(58) Field of Classification Search
USPC ........................... 382/224–228; 707/722–735
See application file for complete search history.

(56) References Cited

U.S. PATENT DOCUMENTS 5,438,628 A * 8/1995 Spitz et al. .................... 382/181
5,555,320 A * 9/1996 Irie et al. ....................... 382/225
5,615,288 A * 3/1997 Koshi et al. ................... 382/248
2002/0164070 A1* 11/2002 Kuhner et al. ................ 382/159
2005/0246300 A1* 11/2005 Tsukamoto ..................... 706/46

FOREIGN PATENT DOCUMENTS

| DE | 102 10 553 A1 | 9/2003 |
|---|---|---|
| JP | 6-75985 | 3/1994 |
| JP | 9-325969 | 12/1997 |
| JP | 11-259509 | 9/1999 |
| JP | 2001-275056 | 10/2001 |
| JP | 2002-183175 | 6/2002 |
| JP | 2003-233622 | 8/2003 |
| JP | 2005-102109 | 4/2005 |
| JP | 2005-107688 | 4/2005 |

OTHER PUBLICATIONS

Office Action in Japanese Patent Application 2006-162419, issue on Jan. 14, 2008.

(Continued)

*Primary Examiner* — Alex Liew
(74) *Attorney, Agent, or Firm* — Finnegan, Henderson, Farabow, Garrett & Dunner, L.L.P.

(57) ABSTRACT

The present invention relates to an information processing apparatus, a feature extraction method, a recording media, and a program that are adapted to easily and correctly extract features of classes in which a plurality of elements are classified. Of all combinations of metadata for each piece of content belonging to each class subject to feature extraction, a combination extraction block 83 extracts a metadata combination that does not exist in any metadata combinations for each piece of content belonging to another class, as the feature of the class in which a content classification block 81 classifies a plurality of pieces of content as instructed by the user. The present invention is applicable to recommendation systems.

16 Claims, 17 Drawing Sheets

(56) References Cited

OTHER PUBLICATIONS

Zhiwen, Yu et al., "Fuzzy Clustering for TV Program Classification"; Proceedings of International Conference on Information Technology: Coding and Computing (ITCC'04) vol. 2, pp. 658-662, (Apr. 5, 2004).

Dumais, Susan et al., "Inductive Learning Algorithms and Representations for Text Categorization", Proceedings of 1998 ACM CIKM International Conference on Information and Knowledge Management Nov. 3-7, 1998, XP007901428, vol. CONF 7, 8 pages, (1998).

Sebastiani, Fabrizio. "Machine Learning in Automated Text Categorization", ACM Computing Surveys, vol. 34, No. 1, (Mar. 2002), pp. 1-47, No. XP00280034.

European Seach report dated Aug. 3, 2009, in corresponding European Application No. EP 06 78 1480.

* cited by examiner

FIG. 3

| CONTENT (ARTIST NAME) | METADATA (KEYWORDS REPRESENTATIVE OF MUSICALITY) | | | | | | | |
|---|---|---|---|---|---|---|---|---|
| | COLOR | GROOVE | CUTE | BOOM | WINTER | SENTIMENTAL | ... |
| ARTIST 1 | 0 | 0 | 0 | 1 | 1 | 0 | ... |
| ARTIST 2 | 1 | 0 | 0 | 0 | 0 | 0 | ... |
| ARTIST 3 | 0 | 0 | 0 | 0 | 1 | 0 | ... |
| ARTIST 4 | 0 | 1 | 1 | 0 | 1 | 0 | ... |
| ARTIST 5 | 0 | 0 | 0 | 0 | 0 | 0 | ... |
| ARTIST 6 | 0 | 0 | 1 | 0 | 0 | 1 | ... |
| ARTIST 7 | 0 | 0 | 0 | 0 | 0 | 0 | ... |
| ARTIST 8 | 0 | 0 | 0 | 0 | 0 | 0 | ... |
| ARTIST 9 | 0 | 0 | 1 | 0 | 0 | 0 | ... |
| ARTIST 10 | 0 | 1 | 0 | 0 | 1 | 0 | ... |
| ARTIST 11 | 0 | 0 | 0 | 0 | 0 | 1 | ... |
| ARTIST 12 | 0 | 0 | 0 | 0 | 0 | 0 | ... |
| ARTIST 13 | 0 | 0 | 1 | 0 | 0 | 1 | ... |
| ARTIST 14 | 0 | 0 | 0 | 0 | 0 | 0 | ... |
| ARTIST 15 | 0 | 0 | 0 | 0 | 0 | 1 | ... |
| ARTIST 16 | 0 | 0 | 0 | 0 | 0 | 0 | ... |
| ARTIST 17 | 1 | 0 | 0 | 1 | 1 | 1 | ... |
| ARTIST 18 | 0 | 0 | 0 | 0 | 0 | 1 | ... |
| ARTIST 19 | 0 | 0 | 0 | 0 | 1 | 0 | ... |
| ARTIST 20 | 1 | 0 | 0 | 1 | 0 | 1 | ... |
| ARTIST 21 | 0 | 0 | 0 | 0 | 0 | 0 | ... |
| ARTIST 22 | 0 | 0 | 1 | 0 | 0 | 1 | ... |
| ARTIST 23 | 1 | 0 | 0 | 0 | 0 | 0 | ... |
| ARTIST 24 | 0 | 0 | 0 | 0 | 0 | 1 | ... |

F I G . 5

| CONTENT (ARTIST NAME) | METADATA (KEYWORDS REPRESENTATIVE OF MUSICALITY) | | | | | | | CLASSIFICATION VIEWPOINT | |
|---|---|---|---|---|---|---|---|---|---|
| | COLOR | GROOVE | CUTE | BOOM | WINTER | SENTIMENTAL | ... | FAVOR/DISFAVOR | PLAY LIST SELECTION |
| ARTIST 1 | 0 | 0 | 0 | 1 | 1 | 0 | ... | NOT MIND | SELECTED |
| ARTIST 2 | 1 | 0 | 0 | 0 | 0 | 0 | ... | FAVOR | SELECTED |
| ARTIST 3 | 0 | 0 | 0 | 0 | 1 | 0 | ... | FAVOR | SELECTED |
| ARTIST 4 | 0 | 1 | 1 | 0 | 1 | 0 | ... | DISFAVOR | SELECTED |
| ARTIST 5 | 0 | 0 | 0 | 0 | 0 | 0 | ... | NOT MIND | SELECTED |
| ARTIST 6 | 0 | 0 | 1 | 0 | 0 | 1 | ... | DISFAVOR | SELECTED |
| ARTIST 7 | 0 | 0 | 0 | 0 | 0 | 0 | ... | DISFAVOR | SELECTED |
| ARTIST 8 | 0 | 0 | 0 | 0 | 0 | 0 | ... | NOT MIND | SELECTED |
| ARTIST 9 | 0 | 0 | 1 | 0 | 0 | 0 | ... | NOT MIND | SELECTED |
| ARTIST 10 | 0 | 1 | 0 | 0 | 1 | 0 | ... | FAVOR | SELECTED |
| ARTIST 11 | 0 | 0 | 0 | 0 | 0 | 1 | ... | FAVOR | SELECTED |
| ARTIST 12 | 0 | 0 | 0 | 0 | 0 | 1 | ... | NOT MIND | UNSELECTED |
| ARTIST 13 | 0 | 0 | 1 | 0 | 0 | 0 | ... | NOT MIND | UNSELECTED |
| ARTIST 14 | 0 | 0 | 0 | 0 | 0 | 1 | ... | FAVOR | UNSELECTED |
| ARTIST 15 | 0 | 0 | 0 | 0 | 0 | 1 | ... | NOT MIND | UNSELECTED |
| ARTIST 16 | 0 | 0 | 0 | 0 | 0 | 1 | ... | DISFAVOR | UNSELECTED |
| ARTIST 17 | 0 | 0 | 0 | 0 | 1 | 0 | ... | DISFAVOR | UNSELECTED |
| ARTIST 18 | 1 | 0 | 0 | 1 | 0 | 1 | ... | NOT MIND | UNSELECTED |
| ARTIST 19 | 0 | 0 | 0 | 0 | 0 | 1 | ... | NOT MIND | UNSELECTED |
| ARTIST 20 | 0 | 0 | 0 | 0 | 1 | 0 | ... | DISFAVOR | UNSELECTED |
| ARTIST 21 | 1 | 0 | 0 | 0 | 0 | 1 | ... | NOT MIND | UNSELECTED |
| ARTIST 22 | 0 | 0 | 1 | 1 | 0 | 1 | ... | NOT MIND | UNSELECTED |
| ARTIST 23 | 1 | 0 | 0 | 0 | 0 | 0 | ... | FAVOR | UNSELECTED |
| ARTIST 24 | 0 | 0 | 0 | 0 | 0 | 1 | ... | FAVOR | UNSELECTED |

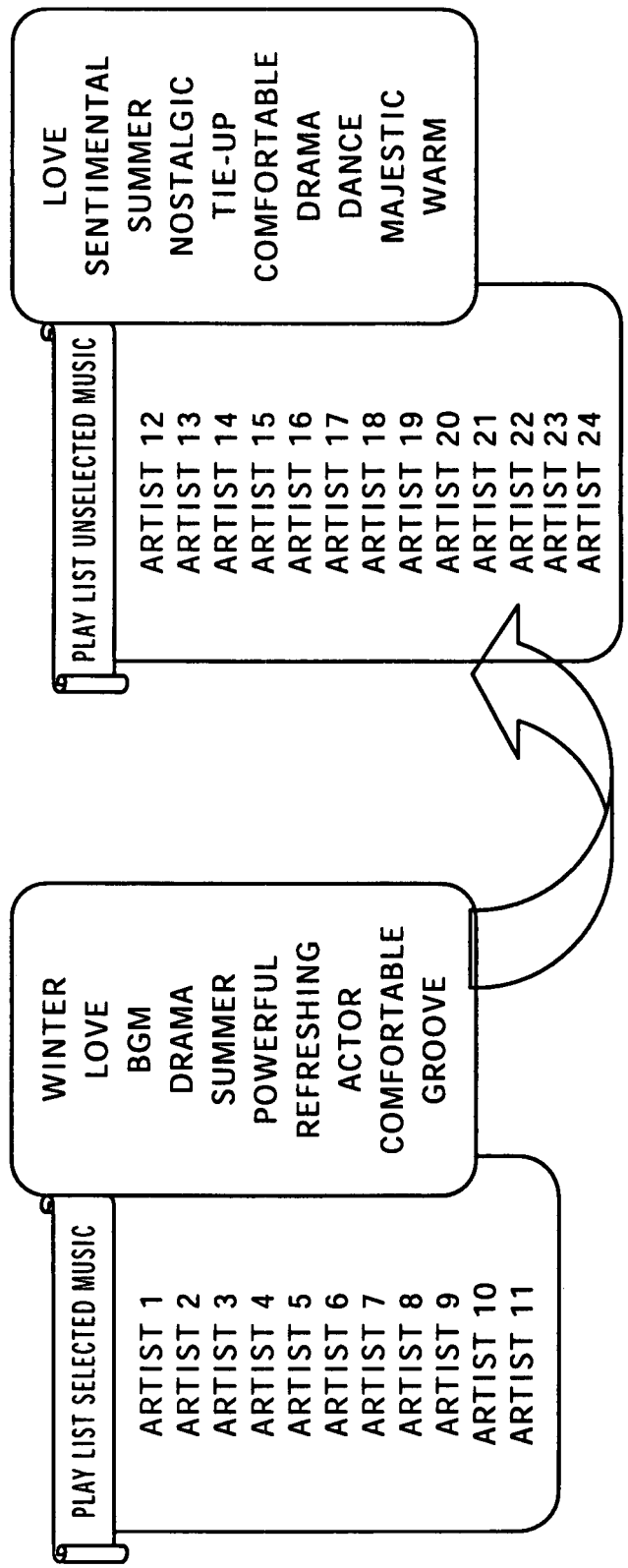

FIG. 8

| CONTENT (ARTIST NAME) | METADATA (KEYWORDS REPRESENTATIVE OF MUSICALITY) | | | | | | | | CLASSIFICATION VIEWPOINT | |
|---|---|---|---|---|---|---|---|---|---|---|
| | COLOR | GROOVE | CUTE | BOOM | WINTER | SENTIMENTAL | ... | | FAVOR/DISFAVOR | PLAY LIST SELECTION |
| ARTIST 1 | 0 | 0 | 0 | 1 | 1 | 0 | ... | | NOT MIND | SELECTED |
| ARTIST 2 | 1 | 0 | 0 | 0 | 0 | 0 | ... | | FAVOR | SELECTED |
| ARTIST 3 | 0 | 0 | 0 | 0 | 1 | 0 | ... | | FAVOR | SELECTED |
| ARTIST 4 | 0 | 1 | 1 | 0 | 1 | 0 | ... | | DISFAVOR | SELECTED |
| ARTIST 5 | 0 | 0 | 0 | 0 | 0 | 1 | ... | | NOT MIND | SELECTED |
| ARTIST 6 | | | | | | 0 | ... | | DISFAVOR | SELECTED |
| ARTIST 7 | | | | | | 0 | ... | | NOT MIND | SELECTED |
| ARTIST 8 | | | | | | 0 | ... | | NOT MIND | SELECTED |
| ARTIST 9 | | | | | | 0 | ... | | FAVOR | SELECTED |
| ARTIST 10 | | | | | | 0 | ... | | FAVOR | SELECTED |
| ARTIST 11 | | | | | | 1 | ... | | NOT MIND | UNSELECTED |
| ARTIST 12 | 0 | 0 | 0 | 0 | 0 | 1 | ... | | NOT MIND | UNSELECTED |
| ARTIST 13 | 0 | 0 | 1 | 0 | 0 | 0 | ... | | FAVOR | UNSELECTED |
| ARTIST 14 | 0 | 0 | 0 | 0 | 0 | 1 | ... | | NOT MIND | UNSELECTED |
| ARTIST 15 | 0 | 0 | 0 | 0 | 0 | 1 | ... | | DISFAVOR | UNSELECTED |
| ARTIST 16 | 0 | 0 | 0 | 1 | 0 | 1 | ... | | DISFAVOR | UNSELECTED |
| ARTIST 17 | 1 | 0 | 0 | 0 | 1 | 1 | ... | | NOT MIND | UNSELECTED |
| ARTIST 18 | 0 | 0 | 0 | 0 | 0 | 1 | ... | | NOT MIND | UNSELECTED |
| ARTIST 19 | 0 | 0 | 0 | 0 | 1 | 0 | ... | | DISFAVOR | UNSELECTED |
| ARTIST 20 | 0 | 0 | 1 | 0 | 0 | 1 | ... | | FAVOR | UNSELECTED |
| ARTIST 21 | 1 | 0 | 0 | 0 | 0 | 0 | ... | | NOT MIND | UNSELECTED |
| ARTIST 22 | 0 | 0 | 0 | 1 | 0 | 1 | ... | | FAVOR | UNSELECTED |
| ARTIST 23 | 1 | 0 | 1 | 0 | 0 | 0 | ... | | FAVOR | UNSELECTED |
| ARTIST 24 | 0 | 0 | 0 | 0 | 0 | 1 | ... | | FAVOR | UNSELECTED |

101 — COMBINATION OF METADATA EXTRACTED AS KEYWORD FOR PLAY LIST SELECTED MUSIC (CRITERION: COMBINATION HAVING GREATEST NUMBER OF METADATA IS PREFERRED)
- "DRAMA" AND "REFRESHING" AND "COMFORTABLE"
- "POWERFUL" AND "REFRESHING" AND "COMFORTABLE"

FIG. 14

| CONTENT (ARTIST NAME) | METADATA (KEYWORDS REPRESENTATIVE OF MUSICALITY) | | | | | | | CLASSIFICATION VIEWPOINT | |
|---|---|---|---|---|---|---|---|---|---|
| | COLOR | GROOVE | CUTE | BOOM | WINTER | SENTIMENTAL | ... | FAVOR/DISFAVOR | FOLDER |
| ARTIST 1 | 0 | 0 | 0 | 1 | 1 | 0 | ... | NOT MIND | POPS |
| ARTIST 2 | 1 | 0 | 0 | 0 | 0 | 0 | ... | FAVOR | POPS |
| ARTIST 3 | 0 | 0 | 0 | 0 | 1 | 0 | ... | FAVOR | POPS |
| ARTIST 4 | 0 | 1 | 1 | 0 | 0 | 0 | ... | DISFAVOR | POPS |
| ARTIST 5 | 0 | 0 | 0 | 0 | 0 | 0 | ... | NOT MIND | POPS |
| ARTIST 6 | 0 | 0 | 1 | 0 | 0 | 1 | ... | DISFAVOR | POPS |
| ARTIST 7 | 0 | 0 | 0 | 0 | 0 | 0 | ... | DISFAVOR | POPS |
| ARTIST 8 | 0 | 0 | 0 | 0 | 0 | 0 | ... | NOT MIND | POPS |
| ARTIST 9 | 0 | 0 | 1 | 0 | 0 | 0 | ... | NOT MIND | POPS |
| ARTIST 10 | 0 | 0 | 0 | 0 | 1 | 0 | ... | FAVOR | POPS |
| ARTIST 11 | 0 | 1 | 0 | 0 | 0 | 1 | ... | FAVOR | POPS |
| ARTIST 12 | 0 | 0 | 0 | 0 | 0 | 1 | ... | NOT MIND | BALLAD |
| ARTIST 13 | 0 | 0 | 1 | 0 | 0 | 0 | ... | NOT MIND | BALLAD |
| ARTIST 14 | 0 | 0 | 0 | 0 | 0 | 1 | ... | FAVOR | BALLAD |
| ARTIST 15 | 0 | 0 | 0 | 0 | 0 | 1 | ... | NOT MIND | BALLAD |
| ARTIST 16 | 0 | 0 | 0 | 0 | 0 | 1 | ... | DISFAVOR | BALLAD |
| ARTIST 17 | 0 | 0 | 0 | 0 | 0 | 0 | ... | DISFAVOR | BALLAD |
| ARTIST 18 | 1 | 0 | 0 | 1 | 1 | 1 | ... | NOT MIND | BALLAD |
| ARTIST 19 | 0 | 0 | 0 | 0 | 0 | 1 | ... | NOT MIND | BALLAD |
| ARTIST 20 | 0 | 0 | 0 | 0 | 1 | 0 | ... | DISFAVOR | BALLAD |
| ARTIST 21 | 1 | 0 | 0 | 1 | 0 | 1 | ... | FAVOR | BALLAD |
| ARTIST 22 | 0 | 0 | 0 | 0 | 0 | 0 | ... | NOT MIND | BALLAD |
| ARTIST 23 | 1 | 0 | 1 | 0 | 0 | 1 | ... | FAVOR | BALLAD |
| ARTIST 24 | 0 | 0 | 0 | 0 | 0 | 1 | ... | FAVOR | BALLAD |

INFORMATION PROCESSING APPARATUS, FEATURE EXTRACTION METHOD, RECORDING MEDIA, AND PROGRAM

TECHNICAL FIELD

The present invention relates generally to an information processing apparatus, a feature extraction method, a recording media, and a program and, more particularly, to an information processing apparatus, a feature extraction method, a recording media, and a program that are adapted to easily and correctly extract features of classes in which a plurality of elements are classified.

BACKGROUND ART

A system is known in which each audience of a program demands a server for the information associated with that program to make the server provide the requested program-associated information stored as previously related with that program to the demanding audience (refer to Patent Document 1 for example).

Also, recently, systems and services have been gaining popularity in which, not only user requests are answered as disclosed in Patent Document 1 shown below, but also products and content (television programs, Web pages, and the like) of user preference are recommended on the basis of the past results of user activities, such as the purchase of products and the viewing of content.

For example, a system was proposed in which phrases constituting the names of programs selected and not selected by each audience are evaluated to preferentially display those candidate programs which contain highly evaluated phrases in their program names (refer to Patent Document 2 for example).

[Patent Document 1]
Japanese Patent Laid-Open No. 2005-102109
[Patent Document 2]
Japanese Patent Laid-Open No. 2001-275056

DISCLOSURE OF THE INVENTION

Problems to be Solved by the Invention

With prior-art systems and services for recommending products and content, recommendation algorithms, such as the enhanced filtering that uses the purchase logs of other users having similar purchase patterns for example on the basis of past user purchase results, are often used. However, this approach makes it difficult to present a clear reason of recommendation to each user.

Also, it can be considered that combinations of data attributes indicative of user preferences be extracted from among data attributes, such as products purchased content viewed by each user in the past, as reasons of recommendation by use of the rough set theory that is a theory for discovering rules or knowledge from data sets, for example. However, this approach involves complicated and huge-size algorithms, requiring huge amounts of computation and huge amounts of storage size necessary for the computation. Hence, it is necessary to restrict the number of and the types of data attributes to be related with products and content or outfit a computer having a high performance enough for executing computation.

In the technique disclosed in Patent Document 2 above, the phrases constituting the names of unselected program are simply subtracted from those of selected programs and the programs having the remaining phrases are recommended. Therefore, this approach does not always correctly extract and reflect user preferences.

It is therefore an object of the present invention to correctly extract the features of classes with a plurality of elements classified.

Means for Solving the Problems

In carrying out the invention and according to one aspect thereof, there is provided an information processing apparatus. This information processing apparatus has feature extraction means for extracting, as a feature of a class in which a plurality of elements related with data indicative of a feature of each of the plurality of elements are classified, of all combinations of the data obtained by taking out one or more pieces of the data related with the plurality of elements for each thereof belonging to the class subject to feature extraction, a combination of the data that does not exist in any combinations of the data obtained by taking out one or more pieces of the data related with the plurality of elements for each thereof belonging to another class.

The above-mentioned information processing apparatus may further have feature presentation control means for controlling presentation of a feature of the class so as to present one or more of combinations of the extracted data to a user as a feature of the class.

The above-mentioned information processing apparatus may still further have data extraction means for extracting, on the basis of a difference between a first degree of association between the element belonging to the class and the data and a second degree of association between the element belonging to the another class and the data, the data more clearly representative of a feature of the element belonging to the class before extracting a combination of the data, the feature extraction means extracting the combination of the data extracted by the data extraction means.

In the above-mentioned information processing apparatus, the data extraction means may obtain a weight of the data in the class on the basis of the first degree of association, the second degree of association, and the difference therebetween, thereby extracting a predetermined number of pieces of the data with a value of the weight being relatively high or the data with the value of the weight being higher than a predetermined threshold value.

In the above-mentioned information processing apparatus, any one of tfidf (term frequency with inverse document frequency), mutual information, information gain ratio, $X^2$ value, and log likelihood ratio may be obtained as the weight of the data in the class.

The above-mentioned information processing apparatus may yet further have element extraction means for extracting, on the basis of the extracted combination of the data, from among elements belonging to a second group different from a first group configured by the plurality of elements, an element associated with the plurality of elements belonging to the class from which the combination of the data has been extracted.

In the above-mentioned information processing apparatus, the element extraction means may extract the element belonging to the second group associated with the data including the extracted combination of the data.

The above-mentioned information processing apparatus may further have element presentation control means for controlling the presentation of the extracted element to a user.

In the above-mentioned information processing apparatus, the element presentation control means may control the presentation so as to further present the combination of the data used for the extraction of the element as a reason for the extraction of the element.

In the above-mentioned information processing apparatus, the plurality of elements may be content and the data may be metadata associated with the content.

The above-mentioned information processing apparatus may still further have evaluation index computation means for computing an evaluation index indicative of a degree of relation between the extracted combination of the data and the element belonging to an extraction class that is the class from which the combination of the data has been extracted.

In the above-mentioned information processing apparatus, the evaluation index computation means may compute an F value that is a harmonic average value between a reproducibility that is a ratio of the plurality of elements associated with the data including the combination of the data among the plurality of elements belonging to the extraction class and an adaptability that is a ratio of the plurality of elements belonging to the extraction class among the plurality of elements associated with the data including the combination of the data.

The above-mentioned information processing apparatus may yet further have class classification means for classifying elements subject to classification into the class on the basis of the evaluation index for the combination of the data associated with the elements subject to classification.

The above-mentioned information processing apparatus may further have class classification means for classifying, of the combination of the data associated with elements subject to classification, the elements subject to classification into the class on the basis of a number matching the combination of the data extracted from the class.

The above-mentioned information processing apparatus may still further have feature presentation means for presenting, of the combination of the data associated with an element subject to feature presentation, a feature of the element subject to feature presentation on the basis of the data included in the combination of the data matching the combination of the data extracted from the class and the class from which the matching combination of the data has been extracted.

In carrying out the invention and according to another aspect there of, there is provided a feature extraction method or program. The feature extraction method or program has the step of extracting, as a feature of a class in which a plurality of elements associated with data representative of a feature of each of the plurality of elements are classified, of all combinations of the data obtained by taking one or more pieces of the data associated with each of the plurality of elements for each of the plurality of elements belonging to the class subject to feature extraction, a combination of the data that does not exist in the combinations of the data obtained by taking one or more pieces of the data associated with each of the plurality of elements for each of the plurality of elements belonging to the class subject to feature extraction.

In one aspect of the present invention, as a feature of a class in which a plurality of elements associated with data representative of a feature of each of the plurality of elements are classified, of all combinations of the data obtained by taking one or more pieces of the data associated with each of the plurality of elements for each of the plurality of elements belonging to the class subject to feature extraction, a combination of the data that does not exist in the combinations of the data obtained by taking one or more pieces of the data associated with each of the plurality of elements for each of the plurality of elements belonging to another class is extracted.

EFFECTS OF THE INVENTION

As described and according to one aspect of the present invention, a feature of a class in which a plurality of elements is classified can be extracted. In addition, according to another aspect of the present invention, a feature of a class in which a plurality of elements is classified can be extracted easily and correctly.

BRIEF DESCRIPTION OF DRAWINGS

FIG. 1 is a block diagram illustrating an information processing system practiced as a first embodiment of the invention.
FIG. 2 is a block diagram illustrating an exemplary configuration of functions of a client computation block of FIG. 1.
[FIG. 3]
FIG. 3 is a diagram illustrating exemplary metadata related with content.
FIG. 4 is a flowchart indicative of keyword extraction processing to be executed by the information processing system shown in FIG. 1.
[FIG. 5]
FIG. 5 is a diagram illustrating viewpoints for content classification.
[FIG. 6]
FIG. 6 is a diagram illustrating a metadata extraction example.
FIG. 7 is a flowchart indicative of details of the metadata extraction processing of step S3 shown in FIG. 4.
[FIG. 8]
FIG. 8 is an exemplary screen for presenting extracted keywords to a user.
FIG. 9 is another exemplary screen for presenting extracted keywords to a user.
FIG. 10 is a flowchart indicative of content recommendation processing to be executed by the information processing system shown in FIG. 1.
FIG. 11 is a block diagram illustrating an information processing system practiced as a second embodiment of the invention.
FIG. 12 is a block diagram illustrating an exemplary configuration of functions of a client computation block shown in FIG. 11.
FIG. 13 is a flowchart indicative of a first embodiment of content classification processing to be executed by the information processing system shown in FIG. 11.
[FIG. 14]
FIG. 14 is a diagram illustrating viewpoints of content classification.
FIG. 15 is a diagram illustrating a metadata extraction example.

FIG. 16 is a flowchart indicative of a second embodiment of content classification processing to be executed by the information processing system shown in FIG. 11.

FIG. 17 is a block diagram illustrating an exemplary configuration of a personal computer.

DESCRIPTION OF REFERENCE NUMERALS

1 . . . information processing system, 11 . . . content viewing client, 12 . . . context detection terminal, 13 . . . content distribution server, 14 . . . content recommendation server, 21 . . . user input block, 22 . . . client computation block, 23 . . . client storage block, 24 . . . client output block, 41 . . . content distribution block, 81 . . . content classification block, 82 . . . metadata extraction block, 83 . . . combination extraction block, 84 . . . keyword presentation block, 85 . . . recommended content extraction block, 86 . . . recommended content presentation block, 201 . . . information processing system, 211 . . . content viewing client, 212 . . . context detection terminal, 213 . . . content distribution server, 214 . . . content recommendation server, 221 . . . user input block, 222 . . . client computation block, 223 . . . client storage block, 224 . . . client output block, 241 . . . content distribution block, 281 content classification block, 282 . . . metadata extraction block, 283 . . . combination extraction block, 291 . . . content classification rule generation block, 292 . . . content automatic classification block, 293 . . . classification result presentation block, 901 . . . CPU, 902 . . . ROM, 903 . . . RAM, 908 . . . recording block, 910 . . . drive, 911 . . . removable media Best Mode for Carrying Out the Invention This invention will be described in further detail by way of example with reference to the accompanying drawings.

Figure 1:
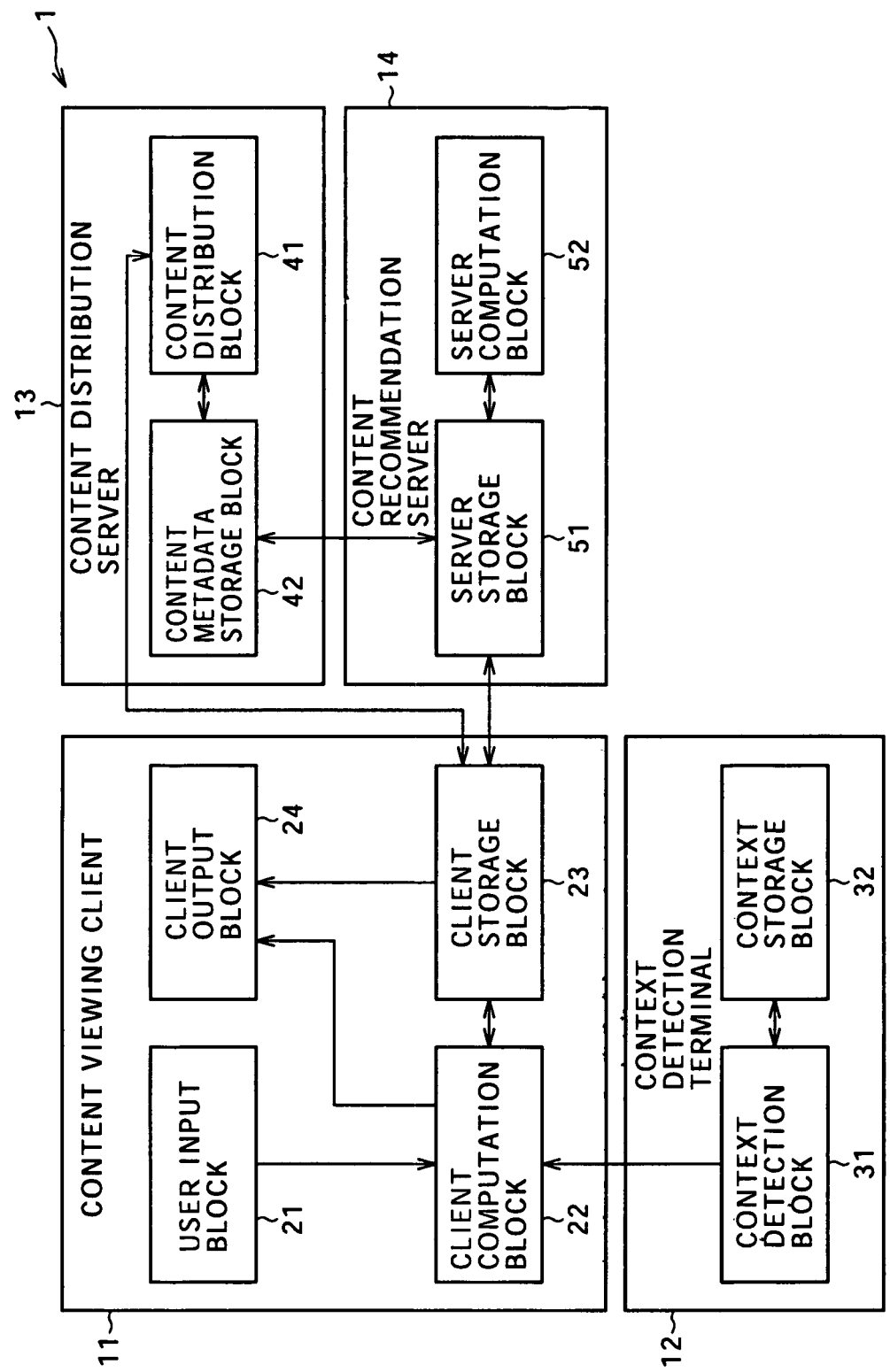
[FIG. 1]

Referring to FIG. 1, there is shown a block diagram of an information processing system 1 practiced as one embodiment of the present invention.

The information processing system 1 is configured to have a content viewing client 11, a context detection terminal 12, a content distribution server 13, and a content recommendation server 14.

The content viewing client 11 is made up of a client computer, consumer electronics equipment (CE equipment), and a portable information terminal, for example. The content viewing client 11 presents the content stored in a client storage block 23 to each user and receives the content from the content distribution server 13 to present to each user.

It should be noted that "content" as referred to herein denotes a wide concept including generally called content, such as television program, movie, photograph, and music (moving image, still image, audio, and combinations thereof), as well as such software and hardware available to each user as various kinds of information, documents, products (including goods), and conversations. However, if content is goods (or hardware), the data about a particular piece of hardware obtained by projecting it to a moving picture or a still picture is used as content data.

It should also be noted that each piece of content to be handled by the information processing system 1 is associated with the metadata indicative of the feature of that piece of content as shown in an example with reference to FIG. 3.

From the viewpoint of functional configuration, the content viewing client 11 is made up of a user input block 21, a client computation block 22, a client storage block 23, and a client output block 24.

The user input block 21 is an input device through which the user executes an operation for the content viewing client 11 and is made up of a keyboard, a mouse, a remote controller, a touch panel, and a microphone, for example. The contents of an operation executed through the user input block 21, the information about the operation to be specific, is supplied to the client computation block 22.

The client computation block 22 is configured herein by a CPU (Central Processing Unit) and one or more programs that are executed thereby, namely, a combination of hardware and software. Obviously, the client computation block 22 may be configured only by software or hardware.

The client computation block 22 controls the client output block 24 so as to present the content stored in the client storage block 23 to the user. In addition, on the basis of a user-specified viewpoint, the client computation block 22 classifies a part or all of the content stored in the client storage block 23 into a plurality of classes. As will be described later with reference to FIG. 7, the client computation block 22 extracts a combination of metadata representative of the feature of each class by use of the context information supplied from the context detection terminal 12 or the information indicative of a user operation supplied from the user input block 21, as required. The client computation block 22 controls the client output block 24 so as to present the extracted metadata combination to the user as the feature of that class.

Also, as will be described later with reference to FIG. 10, on the basis of the extracted metadata combination, the client computation block 22 extracts the content to be recommended to the user from the content stored in the client storage block 23. The client computation block 22 controls the client output block 24 so as to present the information about the extracted content to the user.

Further, the client computation block 22 stores, in the client storage block 23, the information (hereafter referred to as recommended content extraction request information) for requesting the extraction of the content to be recommended to the user on the basis of the extracted metadata combination, this information including a part or all of the extracted metadata combination. The client computation block 22 gets the information indicative of an extraction result from the client storage block 23. On the basis of the obtained extraction result, the client computation block 22 controls the client output block 24 so as to present the information associated with the extracted content to the user.

In addition, the client computation block 22 stores, in the client storage block 23, the information (hereafter referred to as combination extraction result request information) for requesting the extraction of a metadata combination indicative of that class, the information including the information associated with a user-classified class and the metadata associated with the content belonging to that class. The client computation block 22 gets the information indicative of an extraction result for the combination extraction request information from the client storage block 23. On the basis of the extraction result, the client computation block 22 controls the client output block 24 so as to present the extracted metadata combination to the user.

Further, the client computation block 22 stores the information for requesting the distribution (or transmission) of content into the client storage block 23.

The client storage block 23 is configured to have a recording media or a storage media, such as a hard disk drive and a RAM (Random Access Memory), for example. The client storage block 23 stores the context information to be used by the client computation block 22 and the information indicative of user operation commands, from time to time. In addition, the client storage block 23 sends context information, user operation indicative information, recommended content extraction request information, or combination extraction request information to a server storage block 51 of the content recommendation server 14 as required. Further, the client storage block 23 sends the information for requesting the distribution of content to a content distribution block 41 of the content distribution server 13.

The client storage block 23 stores the metadata associated with content, the information indicative of the extraction result of the content to be recommended to the user, and the information indicative of the extraction result of metadata combination supplied from the server storage block 51. Further, the client storage block 23 stores the content supplied from the content distribution block 41. Still further, the client storage block 23 supplies the information indicative of the reception of the content or the content-associate metadata to the client computation block 22. In addition, the client storage block 23 supplies the stored content or the metadata of content to the client output block 24. The client output block 24 is made up of an image output device, such as a monitor or a printer, and an audio output device, such as a loudspeaker, for example.

The client output block 24 presents the content stored in the client storage block 23 to the user in the form of image, text information, or audio, or media printed with image or text information. Also, under the control of the client computation block 22, the client output block 24 presents, to the user, a combination of metadata indicative of the features of classes obtained by classifying the content stored in the client storage block 23 or the information associated with the content to be recommended to the user.

The context detection terminal 12 is configured to have a context detection block 31 and a context storage block 32 from the viewpoint of functional configuration.

The context detection block 31 detects the context information associated with user status and emotion and user situation (a place and a time in which the user exists, for example). To be more specific, the context detection block 31 is made up of a GPS (Global Positioning System) receiver for detecting user's current positional information, a wave clock for measuring (or detecting) the current time, a wireless communications device for detecting people and objects around the user, various kinds of biometric sensors for detecting user's pulsation, breathing rate, perspiration, and pupillary opening, for example, a camera, and an image recognition device. The context detection block 31 detects in real time the above-mentioned context information and stores the detected content information in the context storage block 32. The context detection terminal 12 also supplies the detected context information to the client computation block 22 of the content viewing client 11.

The context storage block 32 is configured to have a recording media or a storage media, such as a hard disk drive and a RAM, thereby storing the content information arranged along time sequence from the context detection block 31.

The content distribution server 13 is made up of broadcasting equipment for content distribution or a server computer. From the viewpoint of functional configuration, the content distribution server 13 is configured to have a content distribution block 41 and a content metadata storage block 42.

The content distribution block 41 is herein made up of a CPU and programs to be executed thereby, namely, a combination of hardware and software. Obviously, the client computation block 22 may be configured only by software or hardware. To be more specific, the content distribution block 41 is made up of a distribution server of a television broadcasting system or a streaming content server on the Internet, for example. The content distribution block 41 distributes (or transmits) content to the client storage block 23 of the content viewing client 11.

The content metadata storage block 42 is configured to have a recording media or a storage media, such as a hard disk drive or a RAM, for example, thereby storing the content distributable by the content distribution server 13 and the metadata that is data about the content. It should be noted that the content or metadata stored in the content metadata storage block 42 is updated in accordance with the operation rules and the like of each content distribution source from time to time.

The content recommendation server 14 is made up of a server computer, for example. From the viewpoint of functional configuration, the content recommendation server 14 is configured to have the server storage block 51 and a server computation block 52.

The server storage block 51 is configured to have a recording media or a storage media, such as a hard disk drive or a RAM, for example. The server storage block 51 appropriately gets and stores the metadata of each piece of content stored in the content metadata storage block 42 and transmits the metadata to the client storage block 23 of the content viewing client 11 as required. In addition, the server storage block 51 stores the context information, the information indicative of user operation, the recommended content extraction request information, or the combination extraction request information from the client storage block 23. Further, the server storage block 51 stores the information indicative of the extraction result of the content to be recommended to the user or the information indicative of metadata combination from the server computation block 52 and transmits these pieces of information to the client storage block 23 or the content metadata storage block 42.

The server computation block 52 is herein made up of a CPU and programs to be executed thereby, namely, a combination of hardware and software. Obviously, the client computation block 22 may be configured only by software or hardware.

On the basis of the information indicative of user operation, the context information, or the recommended content extraction request information stored in the server storage block 51, the server computation block 52 extracts the content to be recommended to the user from among the content with the metadata stored in the server storage block 51. The server computation block 52 stores the information indicative of the result of the extraction of the content to be recommended to the user into the server storage block 51.

On the basis of the information indicative of user operation, the context information, or the combination extraction request information stored in the server storage block 51, the server computation block 52 extracts a combination of metadata representative of the feature of that class. The server computation block 52 stores the result of the extraction of metadata combination into the server storage block 51.

Because FIG. 1 shows an exemplary functional configuration, the form of the connection between the component devices, namely, the form of the connection between the content viewing client 11 through content recommendation server 14, is not especially illustrated. This form of connection is not especially restricted. For example, the form of connection may be wired connection or wireless connection or a combination of thereof. This form of connection may be made through a network or directly between the component devices or a combination thereof. In the case of the networked connection, the form of a network connected is not restricted; for example, the Internet or an intranet may be used. In this case, one or more networks may be used. Therefore, although not shown in FIG. 1, each of the component devices, the content viewing client 11 through content recommendation server 14, is actually arranged with a communications block compliant with the corresponding connection form.

The context detection terminal 12, the content distribution server 13, and the content recommendation server 14 are not indispensable in the information processing system 1. Namely, as will be described with reference to FIGS. 4 through 10, the keyword extraction processing and the content recommendation processing to be executed by the information processing system 1 can be realized only by the content viewing client 11.

Figure 2:
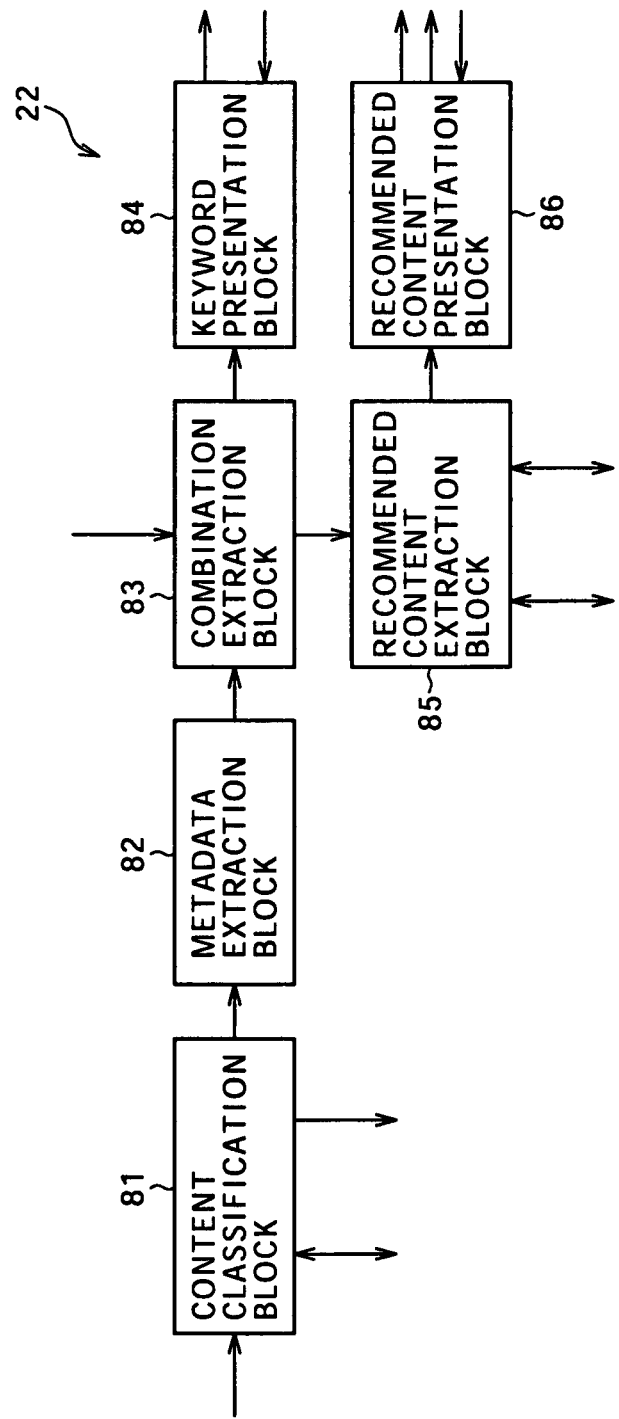
[FIG. 2]

Referring to FIG. 2, there is shown a block diagram illustrating an exemplary functional configuration of the client computation block 22. The client computation block 22 is configured to have a content classification block 81, a metadata extraction block 82, a combination extraction block 83, a keyword presentation block 84, a recommended content extraction block 85, and a recommended content presentation block 86.

The content classification block 81 gets, from the user input block 21, information indicative of a viewpoint for classifying the content entered by the user through the user input block 21. As will be described later with reference to FIG. 4, the content classification block 81 classifies a group constituted by a part or all of the content stored in the client storage block 23 into a plurality of classes. The content classification block 81 supplies the information associated with the obtained classes to the metadata extraction block 82. Also, as required, the content classification block 81 transmits the combination extraction request information to the server computation block 52 via the client storage block 23 and the server storage block 51.

As will be described later with reference to FIG. 4, the metadata extraction block 82 extracts the metadata clearly representative of the feature of the content belonging to a target class on the basis of a difference between the degree of relationship between the content and the metadata belonging to the target class, the degree of relationship between the content and the metadata belonging to a another target class, and the degree of the content and the metadata belonging to the target class. The metadata extraction block 82 supplies the extracted metadata representative information to the combination extraction block 83.

As will be described later with reference to FIG. 7, of all combinations of metadata obtained by taking out one or more pieces of content-related metadata for each of content belonging to a feature extraction target class, the combination extraction block 83 extracts a metadata combination extracted by the metadata extraction block 82, this metadata combination being not found among the metadata combinations obtained by taking out one or more content-related metadata for each content belonging to another class. The combination extraction block 83 supplies the information representative of the extracted metadata combination to the keyword presentation block 84 or the recommended content extraction block 85.

In addition, from the server computation block 52 via the server storage block 51 and the client storage block 23, the combination extraction block 83 receives the information indicative of the extraction result for the combination extraction request information received from the content classification block 81. Further, the combination extraction block 83 supplies the information indicative of the extracted metadata combination to the keyword presentation block 84 or the recommended content extraction block 85.

As will be described later with reference to FIG. 4, the keyword presentation block 84 controls the client output block 24 so as to present one or more extracted metadata combinations to the user as the feature of the class with the metadata combination extracted. At the same time, the keyword presentation block 84 gets the information indicative of user commands for determining or changing the keywords entered by the user through the user input block 21.

As will be described later with reference to FIG. 10, on the basis of the metadata combination extracted by the combination extraction block 83, the recommended content extraction block 85 extracts the content related with the content belonging to the class with the metadata combination extracted from among the pieces of content stored in the client storage block 23 as the content to be recommended to the user. The recommended content extraction block 85 supplies the information associated with the extracted content to the recommended content presentation block 86.

On the basis of the metadata combination extracted from the combination extraction block 83, the recommended content extraction block 85 transmits the recommended content extraction request information for requesting the extraction of the content to be recommended to the user to the server computation block 52 via the client storage block 23 and the server storage block 51. Also, the recommended content extraction block 85 receives the information indicative of the extraction result corresponding to the recommended content extraction request information from the server computation block 52 via the server storage block 51 and the client storage block 23. The recommended content extraction block 85 supplies the information about the extracted content to the recommended content presentation block 86. At the same time, the recommended content extraction block 85 gets the information indicative of the reception of the content or the content associated metadata from the client storage block 23.

The recommended content presentation block 86 controls the client output block 24 so as to present the content extracted by the recommended content extraction block 85 to the user as recommended content and present the metadata combination used for the extraction of the recommended content to the user as the ground (or reason) for the content recommendation. Further, the recommended content presentation block 86 gets, from the user input block 21, the information about a command for determining the recommended content entered by the user through the user input block 21. The recommended content presentation block 86 supplies the information indicative of the content determined by the user to the client storage block 23.

The following describes examples of content to be handled in the information processing system 1 and the metadata associated with the content, with reference to FIG. 3. FIG. 3 shows examples of the content that is music data and the metadata thereof. It should be noted that, for the brevity of description, examples in which metadata is related with each artist who plays music data (or music) are shown in FIG. 3. Obviously, metadata may be related with each piece of music.

In the following description, if metadata B is related with content A, it is appropriately expressed that content A has metadata B or metadata B is set to content A, for example.

In the example shown in FIG. 3, each piece of content (or artist) is related with keywords representative of the musicality of the music to be played by that artist, such as color, groove, cute, boom, winter, and sentimental, as metadata. It should be noted that these keywords are extracted by use of the settings made by music critics or by use of the text analysis of artist-associated reviews and introductory articles, for example. In addition to the keywords representative of musicality, data such as music genre, artist's age and home city, feature quantity extracted from music data, hit chart information, may be used as metadata.

The presence or absence of metadata in each piece of content is indicated by one of binary values 0 or 1. The metadata set to 0 is the metadata not owned by the artist thereof, namely, a keyword not representative of the feature of that artist. The metadata set to 1 is the metadata owned by the artist thereof, namely, a keyword representative of the feature of that artist. It should be noted that if the original value takes a value other than a binary value of 0 or 1, then the metadata is converted into a value 0 or 1 with reference to a predetermined threshold value. For example, if the date of debut of the artist is set to the metadata, the metadata is converted to 0 if the date of debut is before a predetermined date and 1 if the date of debut is thereafter.

The following describes processing to be executed by the information processing system 1 with reference to FIGS. 4 through 10.

First, with reference to the flowchart shown in FIG. 4, keyword extraction processing to be executed by the information processing system 1 will be described. It should be noted that this processing starts when the user enters a command for starting this processing through the user input block 21.

In step S1, the content classification block 81 classifies content. To be more specific, the user enters the information indicative of a viewpoint with which to classify content. The user input block 21 supplies the entered information to the content classification block 81.

FIG. 5 shows an example of viewpoints with which to classify content. It should be noted that, as compared with the table shown in FIG. 3, the table shown in FIG. 5 additionally has an item of classification viewpoints.

FIG. 5 shows two examples of content classification viewpoints; favor/disfavor and listed/unlisted in play list. It should be noted that a play list is a group made up of the pieces of music arbitrarily selected by the user; for example, the user can specify the reproduction of music on a play list basis, thereby sequentially reproducing the pieces of music listed in the play list.

If content (or artists) is classified on the basis of user's favor/disfavor viewpoint, each piece of content is classified into one of three classes "favor," "disfavor," "not mind." This favor/disfavor evaluation may be explicitly set by the user or may be learned by the content viewing client 11 on the basis of user's operation log by setting the evaluation of an artist who plays the music downloaded by the user from an Internet server to "favor" and the evaluation of an artist who plays the music deleted by the user to "disfavor," for example.

If content is classified on the basis of the viewpoint of play list selected music, each piece of content is classified into one of two classes, "selected" in the play list or "unselected."

On the basis of the viewpoint specified by the user, the content classification block 81 classifies the content into a plurality of classes. The content classification block 81 supplies the information associated with the resultant content classes to the metadata extraction block 82.

It should be noted that, in the following description, examples will be described in which content is classified on the basis of the viewpoint of play list selected music and the metadata (or keywords) of the content selected in the play list is extracted. As shown in FIG. 5, the elements (or content) belonging to the class of play list selected music are artists 1 through 11 and the elements (or content) belonging to the class of play list unselected music are artists 12 through 24. Also, in what follows, the class subject to keyword extraction is referred to as an extraction class and other classes are referred to as comparison classes.

In step S2, the metadata extraction block 82 weights the metadata to extract metadata. To be more specific, the metadata extraction block 82 statistically measures the frequency distribution of the metadata owned by each content to weight the metadata. The following describes an example of a statistical measure for metadata weighting.

First, a method using tfidf (term frequency with inverse document frequency) will be described.

In use of the tfidf method, of the pieces of content belonging to class C let the occurrence frequency of content having metadata $W_j$ be fij, the total number of classes be n, and the number of classes to which the content having metadata $W_j$ be nj, then tfidf($C_i$, $W_j$) to be computed by equation (1) below is set to the weight of metadata $W_j$ in class $C_i$.

$$tfidf(C_i, W_j) = fij \times \{1 + \log_e(n/nj)\} \quad (1)$$

It should be noted that, in equation (1) above, the base of logarithm is e (natural logarithm); however, the value of tfidf itself is not so important, so that the base may be 2 or 10.

For example, if the following conditions (1) through (3) are established, tfidf($C_i$, $W_j$) is computed as follows:

(1) The number of classes n in which content (artists) is classified=9, these classes being $C_1$ through $C_9$.

(2) The number of classes $n_1$ to which the content having metadata $W_1$ ("sentimental" for example)=8.

(3) Of the content belonging to class $C_1$, the occurrence frequency $f_{11}$ (the number of artists having metadata $W_1$ in class $C_1$) of the content having metadata $W_1$=5.

In this case, tfidf($C_1$, $W_1$) that is the weight of metadata $W_1$ in class $C_1$ is computed by equation (2) below.

$$tfidf(C_1, W_1) = f_{11} \times \{1 + \log(n/n_1)\} = 5 \times \{1 + \log(9/8)\} = 5.58891 \quad (2)$$

Namely, tfidf($C_1$, $W_1$) is obtained by multiplying local weight fij based on the frequency of metadata $W_j$ by global weight $\{1+\log(n/nj)\}$. It should be noted that tfidf has the following features or merits, for example.

The importance of metadata can be measured by taking the balance between local and global distributions into account.

The weight computing equation has many variations for the use suitable for applications.

Wide use in the weighting of feature words in document classification.

It should be noted that fij may be used as the ratio of the content having metadata $W_j$ in the content belonging to class $C_i$ and n/nj may be made (the total number of pieces of content/the number of pieces of content having metadata $W_j$).

The following describes a method that uses mutual information.

In the use of mutual information, mutual information MI($C_i$, $W_j$) of metadata $W_j$ in certain class $C_i$ to be computed by equation (3) below is set as the weight of metadata $W_j$ in class $C_i$.

[Mathematical Expression 1]

$$MI(C_j, W_j) = \sum_{W \in \{W_j, \overline{W}_j\}} \sum_{C \in \{C_i, \overline{C}_i\}} P(W, C) \log_2 \frac{P(W, C)}{P(W)P(C)} \quad (3)$$

$$= P(W_j, C_i) \log_2 \frac{P(W_j, C_i)}{P(W_j)P(C_i)} +$$

$$P(\overline{W}_j, C_i) \log_2 \frac{P(\overline{W}_j, C_i)}{P(\overline{W}_j)P(C_i)} +$$

-continued $$P(W_j, \overline{C_i})\log_2 \frac{P(W_j, \overline{C_i})}{P(W_j)P(\overline{C_i})} +$$

$$P(\overline{W}_j, \overline{C_i})\log_2 \frac{P(\overline{W}_j, \overline{C_i})}{P(\overline{W}_j)P(\overline{C_i})}$$

where, P( ) is indicative of the probability of the occurrence of the event enclosed by parentheses.

For example, if the following conditions (1) through (5) are established, $MI(C_i, W_j)$ is computed as follows.

(1) The number of classes n in which content (artists) is classified=9 and these classes are $C_1$ through $C_9$.

(2) The total number of pieces of content numA=80.

(3) The total number of pieces of content aFreqw having metadata $W_1$ ("sentimental" for example)=16.

(4) Of the content belonging to class $C_1$, the number of pieces of content aFreqWC having metadata $W_1$=3.

(5) The number of pieces of content aFreQC belonging to class $C_1$=11.

In this case, the probability values appearing in equation (3) are as shown in equations (4) through (9) below.

[Mathematical Expression 2]

$$P(W_j)=a\text{Freq}W/\text{num}A=16/80=0.2 \quad (4)$$

$$P(C_i)=a\text{Freq}C/\text{num}A=11/80=0.1375 \quad (5)$$

$$P(W_j,C_i)=a\text{Freq}WC/\text{num}A=3/80=0.0375 \quad (6)$$

$$P(W_j,\overline{C_i})=(a\text{Freq}C-a\text{Freq}WC)/\text{num}A=(11-3)/80=0.1 \quad (7)$$

$$P(\overline{W}_j,C_i)=(a\text{Freq}W-a\text{Freq}WC)/\text{num}A=(16-3)/80=0.1625 \quad (8)$$

$$P(\overline{W}_j,\overline{C_i})=1-\{P(W_j,C_i)+P(\overline{W}_j,C_i)+P(W_j,\overline{C_i})\}=0.7 \quad (9)$$

Therefore, the value of MI $(C_1, W_1)$ that is the weight of metadata $W_1$ in class $C_1$ can be obtained by substituting the values obtained by equations (4) through (9) above into equation (3) as shown in equation (10) below.

$$MI(C_1,W_1)=0.0375\times\log_2\{0.0375/(0.2\times0.1375)\}+0.1\times\log_2\{0.1/((1-0.2)\times0.1375)\}+0.1625\times\log_2\{0.1625/(0.2\times(1-0.1375))\}+0.7\times\log_2\{0.7/((1-0.2)\times(1-0.1375))\}=0.01677\ldots+(-0.01375\ldots)+(-0.01400\ldots)+0.01453\ldots=0.00355\ldots \quad (10)$$

Namely, the mutual information can be computed by the reduction in entropy of metadata $W_j$ due to the knowledge of attribution to class $C_i$. It should be noted that the mutual information has the following features or merits.

The mutual information uses the idea of entropy, an information theory indicative of the uncertainty of event, thereby making it easy to emphasize the difference between classes.

The mutual information is good at applications in which a summary of documents is created by use of heavily weighted words to know the difference between documents.

Although the description of specific computation examples is skipped herein, information gain ratio, $X^2$ value, or log likelihood ratio, for example, is additionally available as a statistical measure for metadata weighting.

In the use of information gain ratio, information gain ratio $IGR(C_i, W_j)$ of metadata $W_j$ in certain class $C_i$ to be computed by equations (11) through (14) below is set as the weight of metadata $W_j$ in class $C_i$.

[Mathematical Expression 3]

$$IGR(C_i, W_j) = \frac{\text{info}(C_i, W_j) - \text{info}_{div}(C_i, W_j)}{\text{split}(C_i)} \quad (11)$$

$$\text{info}(C_i, W_j) = \sum_{W \in \{W_j, \overline{W}_j\}} p(W \mid C_i)\log_2 p(W \mid C_i) \quad (12)$$

$$\text{info}_{div}(C_i, W_j) = \sum_k \frac{\text{morph}(C_k)}{\text{morph}(C_i)}\text{info}(C_k, W_j) \quad (13)$$

$$\text{split}(C_i) = -\sum_k \frac{\text{morph}(C_k)}{\text{morph}(C_i)}\log\frac{\text{morph}(C_k)}{\text{morph}(C_i)} \quad (14)$$

where, $\text{morph}(C_i)$ is the total number of metadata owned by content belonging to class $C_i$.

Namely, information gain ratio is a ratio of the reduction in entropy of metadata $W_j$ before and after class classification against the entropy associated with class classification. It should be noted that information gain ratio has the following features or merits, for example.

Rather than the weight for each individual class, a large weight is given by the metadata distributed disproportionately to the entire classification (the favor/disfavor classification itself, for example);

Useful for applications in which, for data having a hierarchical structure, feature words must be known under a certain directory.

In the use of $X^2$ value, $X^2(C_i, W_j)$ that is the $X^2$ value of metadata $W_j$ in certain class $C_i$ to be computed by equation (15) below is set as the weight of metadata $W_j$ in class $C_i$.

[Mathematical Expression 4]

$$X2(C_i, W_j) = \sum_{W \in \{W_j, \overline{W}_j\}} \sum_{C \in \{C_i, \overline{C}_i\}} \frac{\{f(W, C \mid H_{dep}) - f(W, C \mid H_{indep})\}^2}{f(W, C \mid H_{indep})} \quad (15)$$

where, $f(W_j, C_i \mid H_{dep})$ is the real number of the number of pieces of content having metadata $W_j$ in class $C_i$; and $f(W_j, C_i \mid H_{indep})$ is the expected value of the number of pieces of content having metadata $W_j$ in class $C_i$.

Namely, $X^2$ value is based on the difference between the real number and the expected value of the number of pieces of content having metadata $W_j$ among the content belonging to class $C_i$ and therefore indicative of the relativity of metadata $W_j$ onto class $C_i$. It should be noted that $X^2$ value has the following features or merits, for example.

Weighting is made on the basis of the occurrence relation of metadata from statistical expected value.

Widely used for the extraction of technical terms classified by domain, for example, that is an identifier allocated to each computer on the Internet and each network connected thereto.

In the use of log likelihood ratio, $LL(C_i, W_j)$ that is the log likelihood of metadata $W_j$ in certain class $C_i$ to be computed by equation (16) below is set as the weight of metadata $W_j$ in class $C_i$.

[Mathematical Expression 5]

$$LL(C_i, W_j) = \sum_{W \in \{W_j, \overline{W}_j\}} \sum_{C \in \{C_i, \overline{C}_i\}} \log \frac{P(W, C \mid H_{dep})}{P(W, C \mid H_{indep})} \quad (16)$$

where, $P(W_j, C_i | H_{dep})$ is the real number of the probability in which the content belonging to class $C_i$ has metadata $W_j$.

$P(W_j, C_i | H_{indep})$ is the expected value of the probability in which the content belonging to class $C_i$ has metadata $W_j$.

Namely, log likelihood ratio is indicative of the ratio between the real number and the expected value of the probability in which the content belonging to class $C_i$ has metadata $W_j$. It should be noted that log likelihood ratio has the following features or merits.

Weighting is made on the basis of the occurrence relation of metadata from statistical expected value.

Widely used for the extraction of technical terms classified by domain, for example, that is an identifier allocated to each computer on the Internet and each network connected thereto.

By use of one of the above-mentioned methods, the metadata extraction block 82 obtains the weight of each metadata in each class. To be more specific, the weight of metadata B in certain class A is obtained on the basis of a difference between the degree of relation between the content belonging to class A and metadata B (or the degree of relation between the content belonging to class A and the feature indicated by metadata B), the degree of relation between the content belonging to another class and metadata B, and the degree of relation between the content belonging to class A and metadata B.

The metadata extraction block 82 extracts, for each class for example, the metadata of a predetermined quantity (ten for example) with the value of set weight being higher or the metadata with the set weight being higher than a predetermined threshold. To be more specific, the metadata extraction block 82 extracts, for each class, the metadata that is indicative of a feature deeply related with the content belonging to that class and indicative of the feature having a deeper relation, than the content belonging to another class.

Then, the metadata extraction block 82 supplies the information indicative of the metadata extracted for each class to the combination extraction block 83. It should be noted that the metadata extracted for each class is referred to as "important-metadata-by-class."

It should be noted that the following description will be made on the assumption that, in step S2, ten pieces of metadata "winter," "love," "BGM," "drama," "summer," "powerful," "refreshing," "actor," "comfortable," and "groove" are extracted from the class subject to extraction and ten pieces of metadata "love," "sentimental," "summer," "nostalgic," "tie-up," "comfortable," "drama," "dance," "majestic," and "warm" are extracted from the class of play list unselected music as shown in FIG. 6. It should also be noted that, for those classes in which keyword extraction is not executed, the extraction of metadata need not always be executed.

In step S3, the combination extraction block 83 executes metadata combination extraction processing. The following describes details of metadata combination extraction processing to be executed by the combination extraction block 83, with reference to the flowchart shown in FIG. 7.

In step S21, the combination extraction block 83 initializes logical expression P.

In step S22, the combination extraction block 83 determines whether there is any content of the class subject to extraction not completed in the comparison with the content of the class subject to comparison. If the content of the extraction class not completed in the comparison with the content of the comparison class is found, then the procedure goes to step S23.

In step S23, the combination extraction block 83 selects one piece of content of the extraction class not completed in comparison. It should be noted that the content selected in step S23 is hereafter referred to as extraction content.

In step S24, the combination extraction block 83 initializes logical expression Q.

In step S25, the combination extraction block 83 determines whether there is any content of the comparison class not completed in the comparison with the extraction content. If the content of the comparison class not completed in the comparison with the extraction content is found, the procedure goes to step S26.

In step S26, the combination extraction block 83 selects one piece of the content of the comparison class not completed in the comparison with the extraction content. It should be noted that the content selected in step S26 is hereafter referred to as comparison content.

In step S27, the combination extraction block 83 extracts the metadata that is owned by the extraction content but not owned by the comparison content. To be more specific, of the important-metadata-by-class of the extraction class, the combination extraction block 83 extracts the metadata that is owned by the extraction content but not owned by the comparison content.

In step S28, the combination extraction block 83 generates logical expression R by linking the extracted metadata with theological "or" operation. For example, of the important-metadata-by-class of the play list selected music that is the extraction class, if "winter," "love," "powerful," "refreshing," and "actor" are extracted as the metadata owned by artist 1 that is the extraction content but not owned by artist 12 that is the comparison content, logical expression R is as shown in equation (17) below.

R="winter" or "love" or "powerful" or "refreshing" or "actor" (17)

It should be noted that, in comparing the extraction content with the comparison content by linking the metadata extracted in logical expression R with the logical "or" operation, the extraction content can be distinguished from the comparison content by determining whether logical expression R is satisfied or not.

In step S29, the combination extraction block 83 adds logical expression R to logical expression Q by linking with the logical "and" operation. Namely, a logical operation shown in expression (18) below is executed.

Q←Q and R (18)

Then, the procedure returns to step S25 to repeat the processing of steps S25 through S29 until there is no more content of the comparison class not completed in the comparison with the extraction content. Namely, the extraction content is compared with all pieces of content contained in the comparison class (other than the extraction class) to extract the metadata owned by the extraction content but not owned by the comparison content of the important-metadata-by-class of the extraction class, the metadata thus extracted being added to logical expression Q. For example, if there is m pieces of content that belong to the comparison class and the logical expression indicative of a result of the comparison between the extraction content and each content of the comparison class is Ri(i=1, 2, ..., m), then logical expression Q is represented by equation (19) below.

$$Q = R1 \text{ and } R2 \text{ and } \ldots \text{ and } Rm \quad (19)$$

To be more specific, logical expression Q becomes as shown in equation (20) below, for example.

$$\begin{aligned}Q = &(\text{"winter" or "love" or "powerful" or "refreshing"}\\ &\text{or "actor") and ("winter" or "love" or "drama" or}\\ &\text{"powerful" or "actor") and ("winter" or "power-}\\ &\text{ful" or "refreshing" or "actor" or "comfortable")}\\ &\text{and ("winter" or "drama" or "powerful" or}\\ &\text{"refreshing" or "actor" or "comfortable") and}\\ &(\text{"winter" or "love" or "drama" or "powerful" or}\\ &\text{"refreshing" or "actor") and ("actor" or "com-}\\ &\text{fortable") and ("winter" or "love" or "refreshing"}\\ &\text{or "actor") and ("powerful" or "refreshing" or}\\ &\text{"actor" or "comfortable") and ("winter" or}\\ &\text{"drama" or "refreshing" or "actor" or "comfort-}\\ &\text{able") and ("winter" or "love" or "drama" or}\\ &\text{"refreshing" or "actor" or "comfortable")}\end{aligned} \quad (20)$$

It should be noted that, in the comparison between the extraction content and the content belonging to the comparison class by linking logical expressions Ri in logical expression Q, the extraction content can be distinguished from all pieces of content belonging to the comparison class by determining whether logical expression Q is satisfied or not.

If no more content of the comparison class not completed in the comparison with the extraction content is found in step S25, namely, if the comparison between the extraction content and all pieces of content of the comparison class has been completed, the procedure goes to step S30.

In step S30, the combination extraction block 83 simplifies logical expression Q. To be more specific, the combination extraction block 83 converts logical expression Q into a standard product-of-sum form expressed in the product of maxterm. For example, term T1 ("winter" or "love" or "powerful" or "refreshing" or "actor"), the first term, is converted into equation (21) below.

$$\begin{aligned}T1 = &(\text{"winter" or "love" or "powerful" or "refreshing"}\\ &\text{or "actor" or} \sim\text{"}BGM\text{" or} \sim\text{"drama" or} \sim\text{"sum-}\\ &\text{mer" or} \sim\text{"comfortable" or} \sim\text{"groove") and}\\ &(\text{"winter" or "love" or "powerful" or "refreshing"}\\ &\text{or "actor" or} \sim\text{"}BGM\text{" or "drama" or} \sim\text{"summer"}\\ &\text{or} \sim\text{"comfortable" or} \sim\text{"groove") and ("winter"}\\ &\text{or "love" or "powerful" or "refreshing" or}\\ &\text{"actor" or "}BGM\text{" or "drama" or} \sim\text{"summer" or}\\ &\sim\text{"comfortable" or} \sim\text{"groove") ... (omitted)}\end{aligned} \quad (21)$$

It should be noted that symbol "~" denotes negation.

Next, the combination extraction block 83 converts logical expression Q that has been converted into the standard product-of-sum form into a standard sum-of-product form. For example, term T1 is converted into equation (22) below.

$$\begin{aligned}T1 = &(\text{"winter" and "love" and "powerful" and}\\ &\text{"refreshing" and "actor" and "}BGM\text{" and}\\ &\text{"drama" and "summer" and "comfortable" and}\\ &\text{"groove") or ("winter" and "love" and "power-}\\ &\text{ful" and "refreshing" and "actor" and "}BGM\text{"}\\ &\text{and "drama" and "summer" and "comfortable"}\\ &\text{and} \sim\text{"groove") or ("winter" and "love" and}\\ &\text{"powerful" and "refreshing" and "actor" and}\\ &\text{"}BGM\text{" and "drama" and "summer" and} \sim\text{"com-}\\ &\text{fortable" and "groove") ... (omitted)}\end{aligned} \quad (22)$$

Further, the combination extraction block 83 simplifies logical expression Q converted into the standard product-of-sum form by use of Quine-McCluskey algorithm, for example. For example, logical expression Q of equation (20) is simplified to equation (23) below.

$$\begin{aligned}Q = &\{\text{"actor"}) \text{ or ("winter" and "comfortable") or}\\ &(\text{"love" and "comfortable") or ("drama" and}\\ &\text{"refreshing" and "comfortable") or ("powerful"}\\ &\text{and "refreshing" and "comfortable")}\end{aligned} \quad (23)$$

Namely, each of the terms linked with logical "or" in logical expression Q of equation (23) is indicative a metadata combination that does not exist in any metadata combinations obtained by taking out one or more pieces of metadata related with each piece of content belonging to the compare class among all metadata obtained by taking one or more pieces of metadata related with each content belonging to the extraction class, these metadata combinations being indicative of the combinations of the important-metadata-by-class of the extraction class.

In step S31, the combination extraction block 83 links logical expression. Q with logical "or" operation and adds to logical expression P. Namely, a logical operation shown in equation (24) below is executed.

$$P \leftarrow P \text{ or } Q \quad (24)$$

Then, the procedure returns to step S22 to repeat the processing of steps S22 through S31 until there is no more content of the extraction class not completed in the comparison with the content of the comparison class. Namely, all pieces of content of the extraction class are compared with all pieces of content of the comparison class. For example, if there are n pieces of content of the extraction class and logical expression Q obtained from a result of the comparison between the pieces of content of the extraction class is Qi(i=1, 2, ..., n), then logical expression P is represented by equation (25) below.

$$P = Q1 \text{ or } Q2 \text{ or } \ldots \text{ or } Qn \quad (25)$$

To be more specific, logical expression P becomes equation (26) below, for example.

$$\begin{aligned}P = &(\text{"}BGM\text{") or ("actor" or ("winter" and "comfort-}\\ &\text{able"") or ("love" and "comfortable") or ("win-}\\ &\text{ter" and "groove") or ("love" and "groove") or}\\ &(\text{"summer" and "groove") or ("refreshing" and}\\ &\text{"groove") or ("drama" and "refreshing" and}\\ &\text{"comfortable") or ("powerful" and "refreshing"}\\ &\text{and "comfortable")}\end{aligned} \quad (26)$$

It should be noted that the content belonging to the extraction class can be distinguished from the content belonging to the comparison class by linking the logical expressions Qi with or operation in logical expression P to determine whether logical expression P is satisfied or not.

If no more content of the extraction class not completed in the comparison with the content of the comparison class is found in step S22, namely, if all pieces of content of the extraction class have been compared with the content of the comparison class, then the procedure goes to step S32.

In step S32, the combination extraction block 83 extracts metadata combinations. To be more specific, the combination extraction block 83 extracts the terms linked with or operation of logical expression P as the feature of the extraction class. For example, if logical expression P takes the values shown in equation (26), then the following ten metadata combinations are extracted.

"BGM"
"actor"
"winder" and "comfortable"
"love" and "comfortable"
"winter" and "groove"
"love" and "groove"
"summer" and "groove"
"refreshing" and "groove"
"drama" and "refreshing" and "comfortable"
"powerful" and "refreshing" and "comfortable"

In step S33, the combination extraction block 83 stores the metadata combinations into the client storage block 23, upon which the metadata combination extraction processing ends. To be more specific, the combination extraction block 83 stores the data indicative of the extracted metadata combinations into the client storage block 23. At the same time, the combination extraction block 83 supplies the information about the extracted metadata combinations to the keyword presentation block 84 and the recommended content extraction block 85.

Referring to FIG. 4 again, in step S4, the keyword presentation block 84 presents a keyword. To be more specific, the keyword presentation block 84 selects one or more of the metadata combinations extracted in step S3. For example, the selection of metadata combinations is executed by the following criteria.

(1) A combination in which the number of contained metadata is highest (for example, in the above-mentioned example shown in step S32, ("drama" and "refreshing" and "comfortable") or ("powerful" and "refreshing" and "comfortable")).

(2) A combination in which the number of contained metadata is lowest (for example, in the above-mentioned example shown in step S32, ("BGM") or ("actor")).

(3) A combination in which the total value or the average value of the weights of the metadata set in step S2.

(4) A combination owned by most pieces of content belonging to the extraction class.

(5) A combination owned by particular pieces of content belonging to the extraction class.

(6) All combinations.

It should be noted that the above-mentioned criteria are selected in accordance with the specifications and purposes of use of each system or application program that uses combinations of extracted metadata.

The keyword presentation block 84 controls the client output block 24 to present the selected metadata to the user. For example, the keyword presentation block 84 generates the image data for displaying the selected metadata combination. The keyword presentation block 84 supplies the generated image data to the client output block 24, thereby displaying an image based on the image data, namely, the metadata (or a keyword) indicative of the feature of the play list selected class that is the extraction class, onto the client output block 24.

Referring to FIG. 8, there is shown an exemplary screen that is displayed on the client output block 24. In the example shown in FIG. 8, a popup window 101 is displayed on the client output block 24 along with the above-mentioned table shown in FIG. 5. The popup window 101 shows the combinations of metadata extracted as keywords (representative of the features of play list selected class) for play list selected music. Also, the popup window 101 shows a message indicative that the metadata extraction has been made by prioritizing those combinations which include many metadata.

Further, so as to make clear the selection of play list selected music as the content classification viewpoint, the background of the row of items of play list selected music is highlighted by hatching or a color that is different those of other rows, for example. Also, so as to make clear the content belonging to the class subject to the keywords displayed in the popup window 101, the background of the column of artists 1 through 11 of the row indicative of the content at the left end of the table is highlighted by hatching or a color which is different from those of other rows, for example.

The above-mentioned highlighting allows the user to easily recognize the feature (or trend) of the play list selected by the user.

Figure 9:
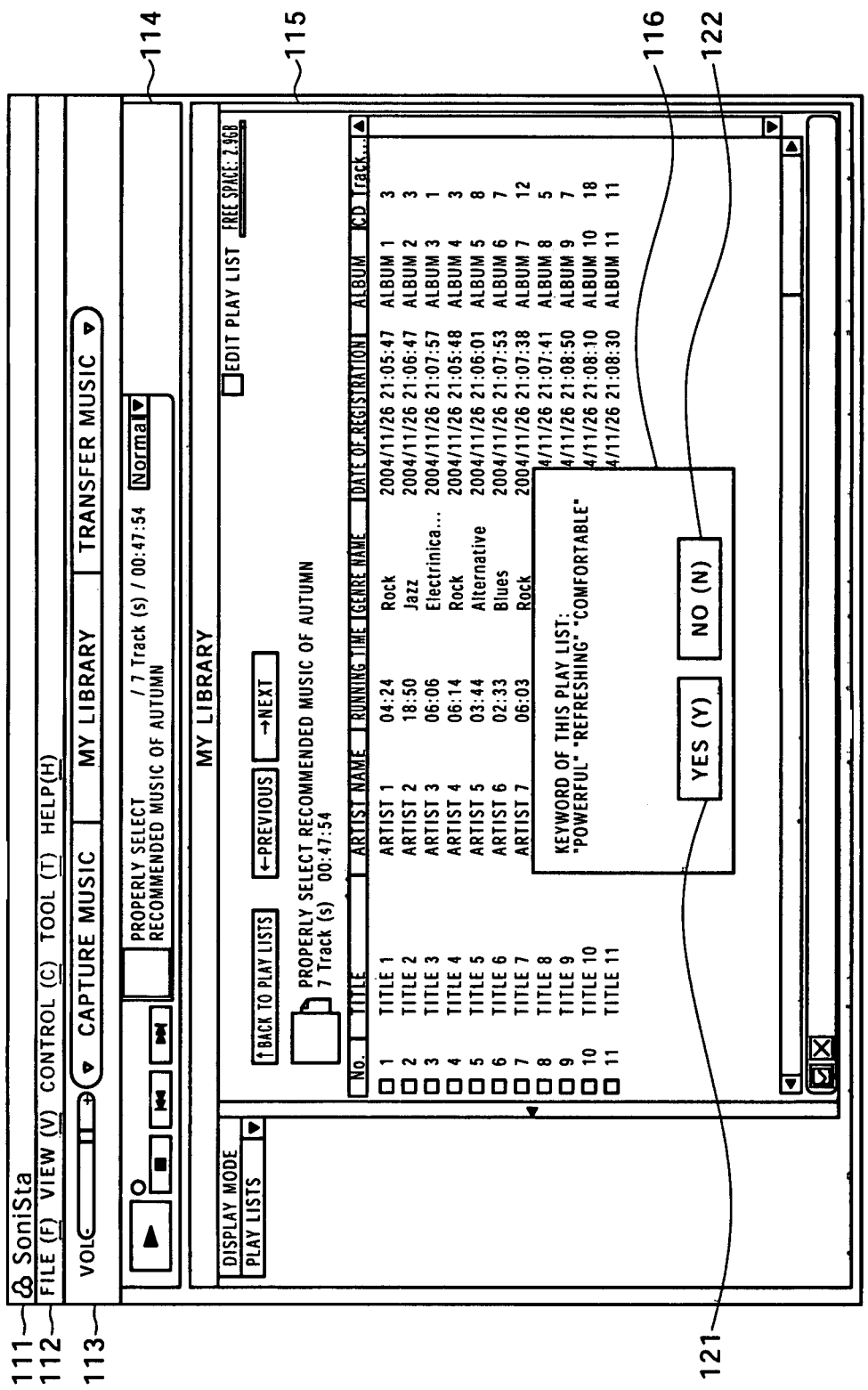
[FIG. 9]

Referring to FIG. 9, there is shown another exemplary screen to the displayed on the client output block 24 in step S4. FIG. 9 shows an example in which the extracted keywords are displayed on the screen for actually creating a play list.

A title bar 111 displays the product name of the software used to display this screen, for example. A menu bar 112 shows menus for displaying various operations. A window 113 shows GUI (Graphical User Interface) for controlling volume and switching between operation modes, for example. A window 114 shows GUI for executing content reproduction, stop, and skip, for example.

A window 115 shows a list of music selected in the play list, for example. The music list shows serial No., title, artist name, running time, music genre, date of registration with play list, album name for music source identification, and track No. of music in source album, for example.

A window 116 shows keywords and so on indicative of the feature of the play list shown in the window 115. Checking the window 116, the user is able to easily know the feature (or trend) of the play list created by that user. Also, pressing a button 121 allows the user, on the basis of keywords shown in the window 116, to automatically create a proper play list title, such as "a collection of powerful, refreshing, and comfortable songs," for example. When a button 122 is pressed, the automatic creation of title is not executed, upon which the window 116 is closed.

In step S5, the keyword presentation block 84 determines whether to change keywords. If no keyword change is specified, the procedure goes to step S6.

In step S6, the content classification block 81 determines whether to change content classification viewpoints. If no viewpoint change is specified, the procedure goes to step S7.

In step S7, the keyword presentation block 84 judges whether to determine keywords. If no keyword establishment is specified, the procedure returns to step S5.

Then, the processing of steps S5 through S7 is repeated until the keyword change is specified in step S5, the viewpoint change is specified in step S6, or the keyword establishment is specified in step S7.

If the user enters the information for specifying the keyword change through the user input block 21 to change the presented keywords, for example, in step S5, the user input block 21 supplies this information to the keyword presentation block 84. Receiving the keyword change specification information, the keyword presentation block 84 determines the keyword change, upon which the procedure returns to step S4.

Then, in step S4, another combination is selected from among the metadata combinations extracted in step S3 and the selected metadata is presented on the client output block 24 as the keyword indicative of the feature of the extraction class.

If the user enters the information for specifying the change of content classification viewpoints through the user input block 21 to extract the keywords of a class obtained by classifying content from another viewpoint, for example, in step S6, then the user input block 21 supplies the entered information to the content classification block 81. Receiving this information, the content classification block 81 determines the change of content classification viewpoints, upon which the procedure returns to step S1.

Then, the content is classified by the new viewpoint (for example, the content is classified by the viewpoint favor/disfavor) in step S1 and the processing of step S2 and on is executed on the newly classified class. It should be noted that the user may explicitly specify a new viewpoint or the content classification block 81 may automatically set a new viewpoint on the basis of the predetermined setting.

If the user enters the information for specifying the keyword establishment through the user input block 21 in step S7, then the user input block 21 supplies that information to the keyword presentation block 84. Receiving the information for specifying the keyword establishment, the keyword presentation block 84 determines the key word determination, upon which the keyword extraction processing ends.

It should be noted that, if an idle status in which no response is made by the user after the presentation of the keyword to the user has passed for a predetermined time, the keywords to be presented may be automatically changed or the viewpoints for content classification may be changed, for example.

As described above, combinations of metadata representative of the feature of the class classified from the viewpoint specified by the user can be easily extracted. Each extracted metadata combination is indicative of the feature of the extraction class relative to the comparison class as described above, correctly representing the feature of the extraction class. Further, metadata combinations can be extracted by use of simple logical operations. In addition, extracting the important-metadata-by-class to narrow down the number of pieces of metadata before extracting metadata combinations allows the reduction in the computation quantity and the storage size of necessary storage media. Therefore, the present invention is easily applicable to such devices low in processing capability as portable music players.

Figure 10:
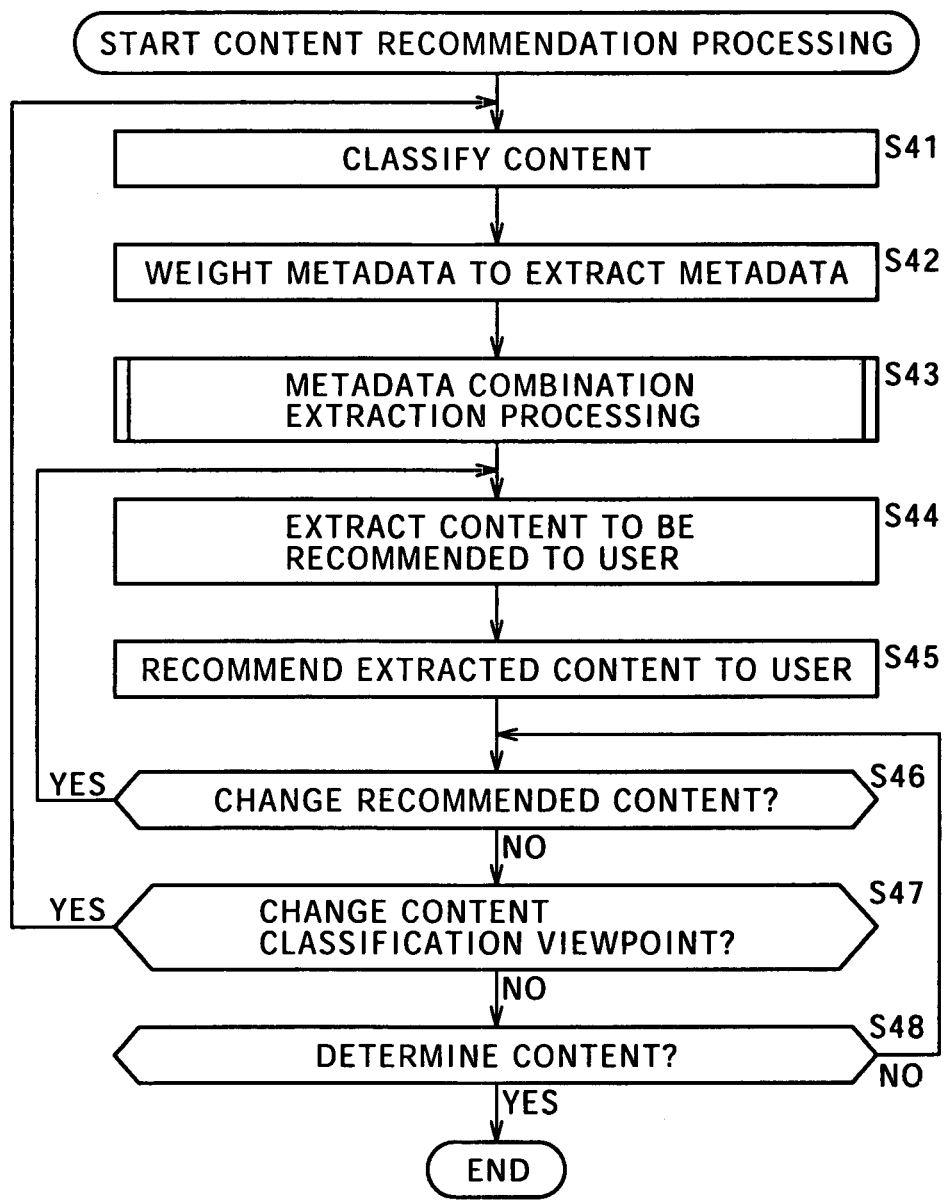
[FIG. 10]

The following describes content recommendation processing to be executed by the information processing system 1 with reference to the flowchart shown in FIG. 10.

Figure 4:
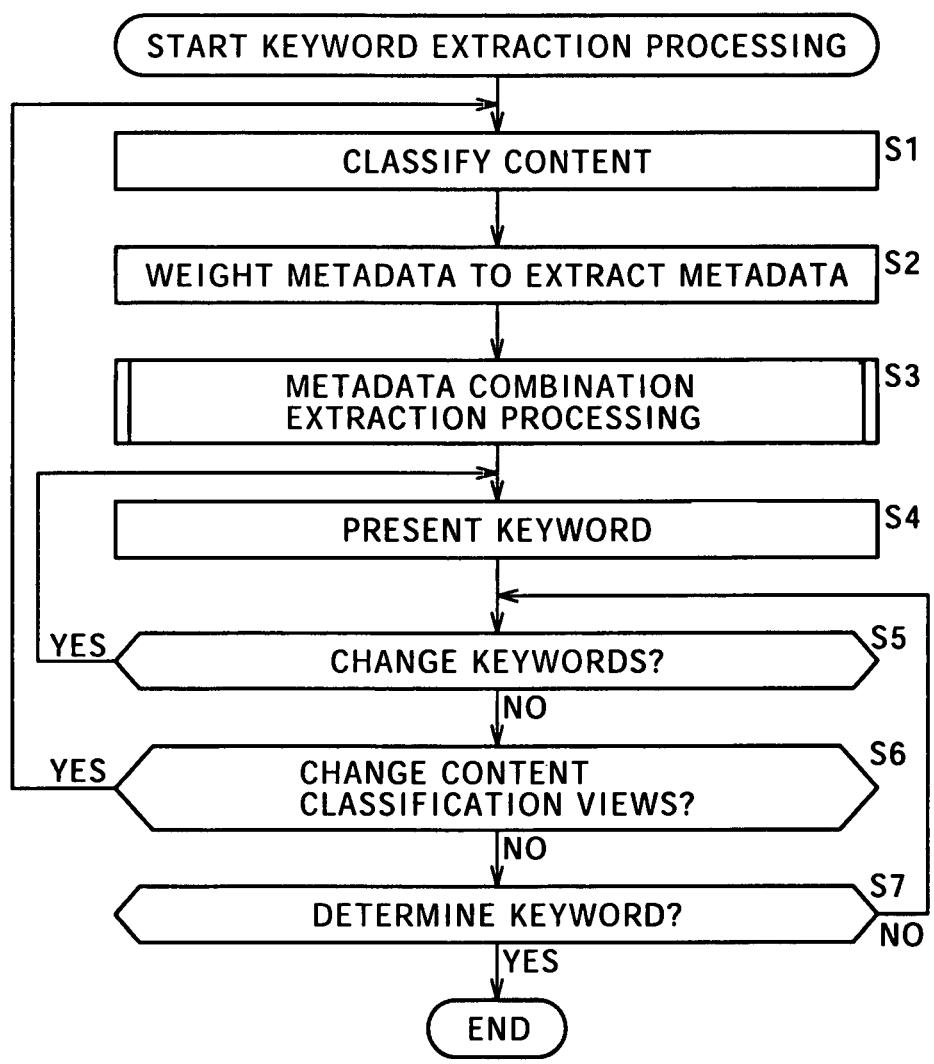
[FIG. 4]

In step S41, content is classified in the same manner as the processing of step S1 shown in FIG. 4.

In step S42, the metadata is weighted in the same manner as the processing of step S2 shown in FIG. 4, thereby extracting the important-metadata-by-class.

Figure 7:
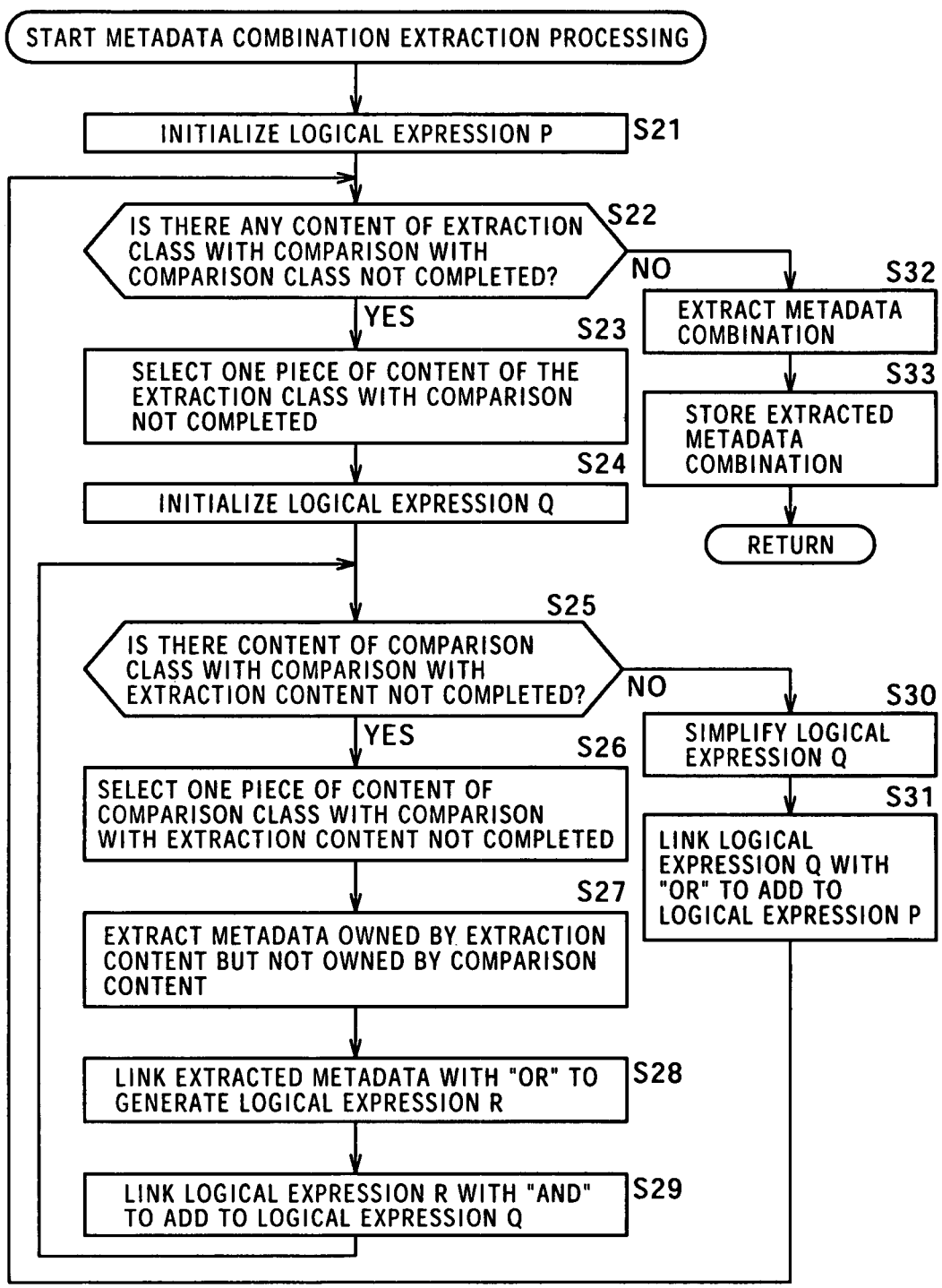
[FIG. 7]

In step S43, metadata combination extraction processing is executed in the same manner as the processing of step S3 shown in FIG. 4, namely, in accordance with the flowchart shown in FIG. 7.

In step S44, the recommended content extraction block 85 extracts the content to be recommended to the user. For example, on the basis of the metadata combination extracted in step S43, the recommended content extraction block 85 extracts the content associated with the content belonging to the extraction class in which the metadata combination has been extracted, from among the pieces of content belonging to a different group from that made up of the content classified in step S1, as the content to be recommended to the user.

To be more specific, if the metadata associated with newly released content (new movie, program, or music, for example) is supplied from the server storage block 51 to the client storage block 23, for example, the client storage block 23 stores the received metadata and supplies the information indicative of the newly released content to the recommended content extraction block 85. The recommended content extraction block 85 selects a metadata combination for extracting the content to be recommended to the user from among the metadata combinations extracted in step S43, by use of the same criteria as those described before in step S4, for example. The recommended content extraction block 85 extracts the content having the metadata including the selected metadata combination from among the pieces of newly released content stored in the client storage block 23. The recommended content extraction block 85 supplies the information about the extracted content to the recommended content presentation block 86.

It is also practicable that, on the basis of the extracted metadata combination, recommended content extraction request information for requesting the extraction of the content to be recommended to the user is transmitted from the recommended content extraction block 85 to the server computation block 52 via the client storage block 23 and the server storage block 51, thereby making the server computation block 52 extract the content having the metadata including the extracted metadata combination from among the pieces of content with the metadata stored in the server storage block 51.

It should be noted the method of extracting the content to be recommended to the user is not restricted to that described above; for example, other methods are available for extracting the content associated with the content belonging to the extraction class, namely, the content to be recommended to the user on the basis of the extracted metadata, in which the matching is executed on the basis of the vector space method and the state behavior function.

In step S45, the recommended content presentation block 86 recommends the content to the user. To be more specific, the recommended content presentation block 86 controls the client output block 24 to present the content extracted in step S44 to the user as the recommended content. For example, the recommended content presentation block 86 generates the image data for recommending the content extracted in step S44 to the user. The recommended content presentation block 86 supplies the generated image data to the client output block 24 to display the image based on this image data, namely, the image for recommending the content to the user. This image includes the information (the title and overview, for example) about the content to be recommended and the grounds (or the reason of recommendation) for content recommendation. The content recommendation reason may be the metadata combination used for the extraction of the recommended content or a recommendation text created on the basis of the metadata combination, for example.

In step S46, the recommended content presentation block 86 determines whether to change the content to be recommended. If no change of the recommended content is specified, the procedure goes to step S47.

In step S47, it is determined whether to change content classification viewpoints like the processing of step S47 shown in FIG. 4. If no change of content classification viewpoints is specified, the procedure goes to step S48.

In step S48, the recommended content presentation block 86 judges whether to determine the content. If the content is not to be determined, the procedure returns to step S46.

Then, the processing of steps S46 through S48 is repeated until the change of recommended content is specified in step S46, the change of content classification viewpoints is specified in step S47, or the content is determined in step S48.

If the user enters the information for specifying the change of content through the user input block 21 to change the recommended content in step S46, then the user input block 21 supplies this information to the recommended content presentation block 86. Receiving the information, the recommended content presentation block 86 determines that the recommended content is to be changed, upon which the procedure returns to step S44.

Then, in step S44, another metadata combination is selected from among the metadata combinations extracted in step S43 and the content extracted on the basis of the selected metadata combination is recommended to the user.

If the change of content classification viewpoints is specified in step S47, the procedure returns to step S41.

Then, the content is classified by the new viewpoint (the favor/disfavor viewpoint for example) in step S41 and the processing of steps S2 and on is executed on the newly classified class.

If the user likes the recommended content, wants to view that content, and enters the information for specifying the determination of that content through the user input block 21 in step S48, for example, then the user input block 21 supplies this information to the recommended content presentation block 86. Receiving this information, the recommended content presentation block 86 judges the determination of the content, upon which the content recommendation processing ends.

Then, the recommended content presentation block 86 supplies the information indicative of the determined content to the client storage block 23. For example, if the determined content is stored in the client storage block 23, the client storage block 23 supplies this content to the client output block 24. The client output block 24 displays an image or output the sound based on the content, for example.

If the determined content is not stored in the client storage block 23, the client storage block 23 supplies the information for requesting the distribution of the determined content to the content distribution block 41. The content distribution block 41 distributes the requested content to the client storage block 23. The client storage block 23 stores the distributed content and, at the same time, supplies the distributed content to the client output block 24. The client output block 24 displays an image or outputs a sound based on the supplied content, for example.

It should be noted that, if an idle state in which no response comes from the user passes for a predetermined time after the recommendation of the content to the user, the content to be recommended or the viewpoint for classifying the content may be automatically changed, for example.

As described above, the content extracted on the basis of the metadata combination representative of the feature of the class obtained by classification by user-specified viewpoint can be recommended to the user and the grounds (or the reason) for the recommendation can be clearly presented to the user. For example, use of a metadata combination extracted from the class obtained by the viewpoint based on user preference (favor/disfavor of user of example) allows the recommendation of the content correctly reflecting user preference to the user. Also, classifying content from a viewpoint different from that based on user preference allows the recommendation of content independent of user preference, such as the content aiming at the sale promotion by content providers, for example.

The following describes a second embodiment of the present invention with reference to FIGS. 11 through 16.

Figure 11:
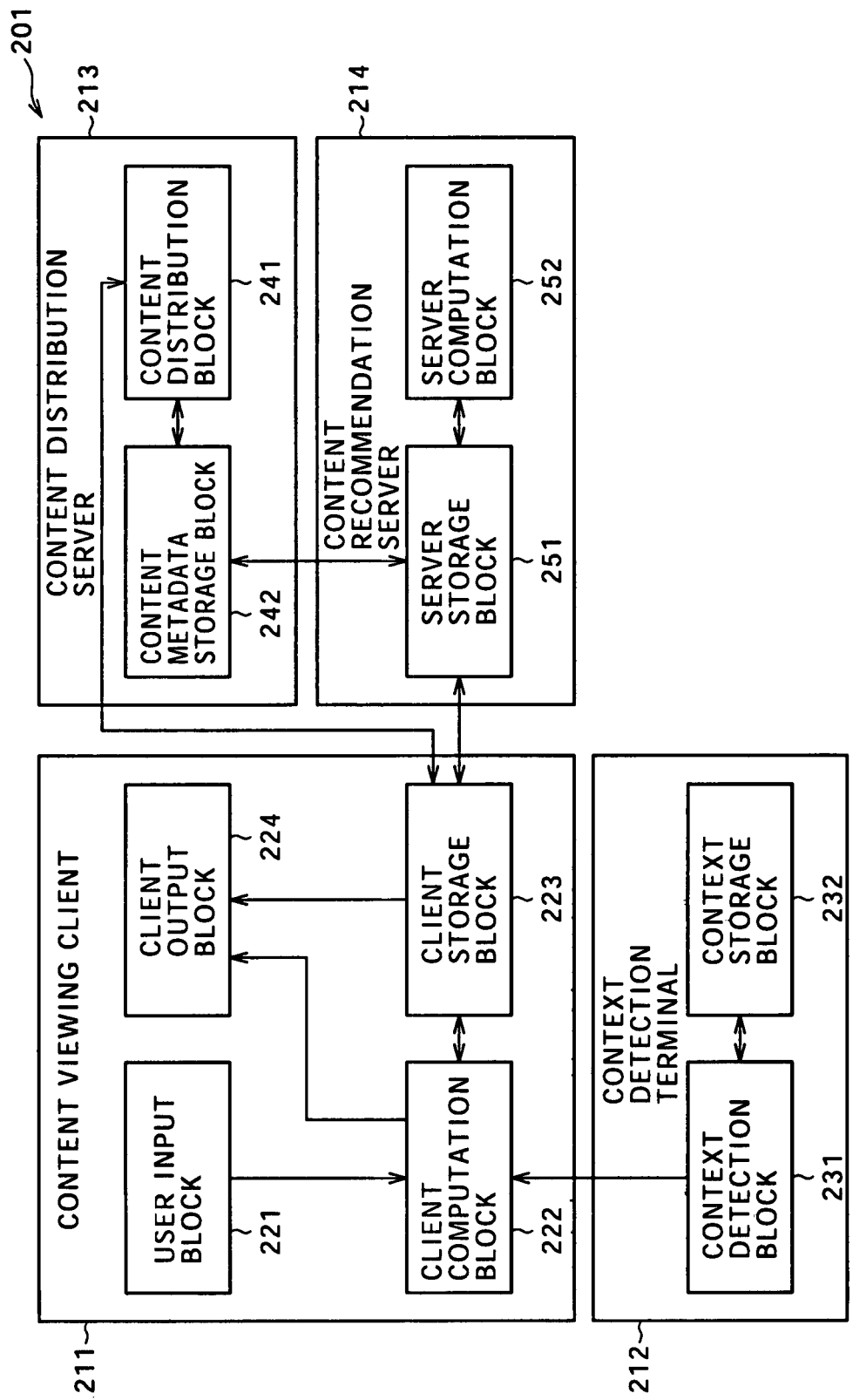
[FIG. 11]

Referring to FIG. 11, there is shown a block diagram illustrating an information processing system practiced as a second embodiment of the present invention.

An information processing system 201 is configured to have a content viewing client 211, a context detection terminal 212, a content distribution server 213, and a content recommendation server 214. From the viewpoint of functional configuration, the content viewing client 211 is configured to have a user input block 221, a client computation block 222, a client storage block 223, and a client output block 224. From the viewpoint of functional configuration, the context detection terminal 212 is configured to have a context detection block 231 and a context storage block 232. From the viewpoint of functional configuration, the content distribution server 213 is configured to have a content distribution block 241 and a content metadata storage block 242. From the viewpoint of functional configuration, the content recommendation server 214 is configured to have a server storage block 251 and a server computation block 252. It should be noted that component blocks corresponding to those shown in FIG. 1 are denoted by the reference numerals of which lower two digits are the same as those shown in FIG. 1 and the description of the same processing as that described for the above-mentioned first embodiment of the present invention will be skipped for the brevity of description.

As will be described later with reference to FIG. 13 or 16, the client computation block 222 generates content classification rules for classifying content into a predetermined class and computes an evaluation index indicative of the reliability of the generated content classification rules on the basis of the information associated with the content and metadata stored in the client storage block 223, the context information supplied from the context detection terminal 212, or the information indicative of a user operation supplied from the context detection terminal 212. On the basis of the generated content classification rules, the client computation block 222 classifies the content specified by the user, for example, for classification. The client computation block 222 controls the client output block 224 to present a result of the content classification and the feature of the content, for example, to the user. Also, the client computation block 222 stores the information associated with the generated content classification rules and evaluation index into the client storage block 223.

The client storage block 223 stores the received information associated with the generated content classification rules and evaluation index. Also, the client storage block 223 transmits the received information associated with the generated content classification rules and evaluation index to the server storage block 251 of the content recommendation server 214, as required.

Under the control of the client computation block 222, the client output block 224 presents a result of the content classification and the feature of the content, for example, to the user.

The server storage block 251 stores the information associated with the generated content classification rules and evaluation index supplied from the client storage block 223. Also, the server storage block 251 stores the information associated with the generated content classification rules and evaluation index or the information associated with the result of the content classification supplied from the server computation block 252.

On the basis of the information indicative of a user operation and the context information stored in the server storage block 251, the server computation block 252 generates content classification rules for classifying the content stored in the server storage block 251 and computes an evaluation index indicative of the reliability of the generated content classification rules. On the basis of the generated content classification rules, the server computation block 252 classifies the content stored in the server storage block 251. The server computation block 252 stores the information indicative of the generated content classification rules or the information indicative of a result of the content classification into the server storage block 251.

Because FIG. 11 shows an exemplary functional configuration, the form of connection between component blocks, namely, the form of connection between component blocks, the content viewing client 211 through the content recommendation server 214, is not especially illustrated; however, this form of connection is especially limited to a certain form. Namely, the form of connection may be wired connection or wireless connection or a combination of thereof. This form of connection may be made through a network or directly between the component devices or a combination thereof. In the case of the networked connection, the form of a network connected is not restricted; for example, the Internet or an intranet may be used. In this case, one or more networks may be used. Therefore, although not shown in FIG. 11, each of the component devices, the content viewing client 211 through content recommendation server 214, is actually arranged with a communications block compliant with the corresponding connection form.

The context detection terminal 212, the content distribution server 213, and the content recommendation server 214 are not indispensable in the information processing system 201. Namely, as will be described with reference to FIG. 13 or 16, the content classification processing to be executed by the information processing system 201 can be realized only by the content viewing client 211.

Figure 12:
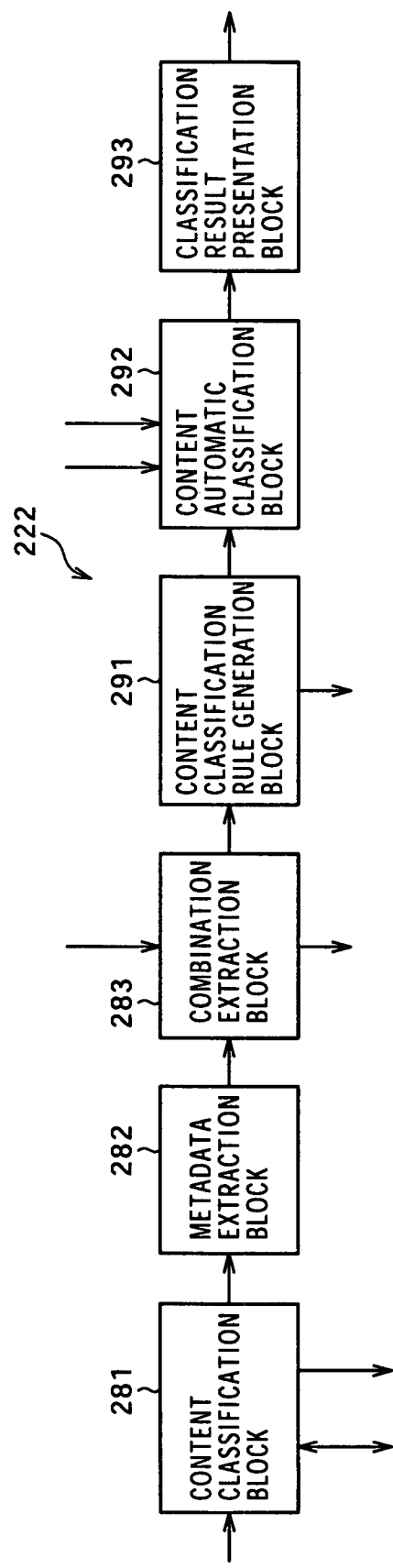
[FIG. 12]

FIG. 12 shows a block diagram illustrating an exemplary functional configuration of the client computation block 222. The client computation block 222 is configured to have a content classification block 281, a metadata extraction block 282, a combination extraction block 283, a content classification rule generation block 291, a content automatic classification block 292, and a classification result presentation block 293. It should be noted that component blocks corresponding to those shown in FIG. 2 are denoted by the reference numerals of which lower two digits are the same as those shown in FIG. 1 and the description of the same processing as that described for the above-mentioned first embodiment of the present invention will be skipped for the brevity of description.

The combination extraction block 283 supplies the information indicative of an extracted metadata combination to the content classification rule generation block 291.

As will be described later with reference to FIG. 13, the content classification rule generation block 291 generates content classification rules and computes an evaluation index for the generated content classification rules. The content classification rule generation block 291 supplies the information associated with the generated content classification rules and the information associated with the computed evaluation index to the content automatic classification block 292 and stores these pieces of information into the client storage block 223.

The content automatic classification block 292 gets the information entered by the user through the user input block 221 for specifying the content to be automatically classified from the user input block 221. Also, the content automatic classification block 292 gets the information indicative of the existence of newly released content or recommended content from the client storage block 223. As will be described later with reference to FIG. 13 or FIG. 16, the content automatic classification block 292 classifies, on the basis the content classification rules, the content subject to classification, such as user-specified content or the newly released or recommended content notified from the client storage block 223 into predetermined classes. The content automatic classification block 292 supplies the information associated with a result of the content classification to the classification result presentation block 293.

The classification result presentation block 293 controls the client output block 224 so as to present the result of the content classification and the feature of the content to the user.

The following describes the processing to be executed by the information processing system 201 with reference to FIGS. 13 through 16.

First, with reference to the flowchart shown in FIG. 13, a first embodiment of the content classification processing to be executed by the information processing system 201 will be described. It should be noted that this processing starts when the user enters a command for starting the content classification processing through the user input block 221, for example.

In step S101, the content classification block content classification block 281 classifies the content into a plurality of classes on the basis of a user-specified viewpoint by the same processing as that of step S1 shown in FIG. 4 and supplies the information associated with the resultant content classes to the metadata extraction block 282.

FIG. 14 shows exemplary viewpoints for use in the content classification shown in FIG. 3. It should be noted that, as compared with the table shown in FIG. 3, the table shown in FIG. 14 is added with an item of classification viewpoints. Also, FIG. 14 shows two examples of user favor/disfavor and content storage folders. The user favor/disfavor viewpoints are the same as those described before with reference to FIG. 5.

It should be noted that the following description is made by use of an example in which there are two types of content storage folders, "pops" and "ballad." For example, on the basis of tune of the content (music in this example), the user classifies each piece of content into the "pops" or "ballad" folder for the management of the content. Therefore, if the content is classified from the viewpoint of a content storage folder, each piece of content is classified into one of the two classes "pops" and "ballad."

For the brevity of description, it is assumed that the content belonging to the class of "play list selected music" in the example of FIG. 5 belong to the class of "pops," namely, stored in the folder of "pops" in the example of FIG. 14; the content belonging to the class of "play list unselected music" in the example of FIG. 5 belong to the class of "ballad," namely, stored in the folder of "ballad" in the example of FIG. 14.

It should be noted that, in what follows, an example is used in which a folder storing content is specified by the user as a content classification viewpoint in step S101.

In step S102, the metadata extraction block 282 weights metadata by the same processing as that of step S2 shown in FIG. 4, extracting the important-metadata-by-class for each class. The metadata extraction block 282 supplies the information indicative of the extracted important-metadata-by-class to the combination extraction block 283.

Figure 15:
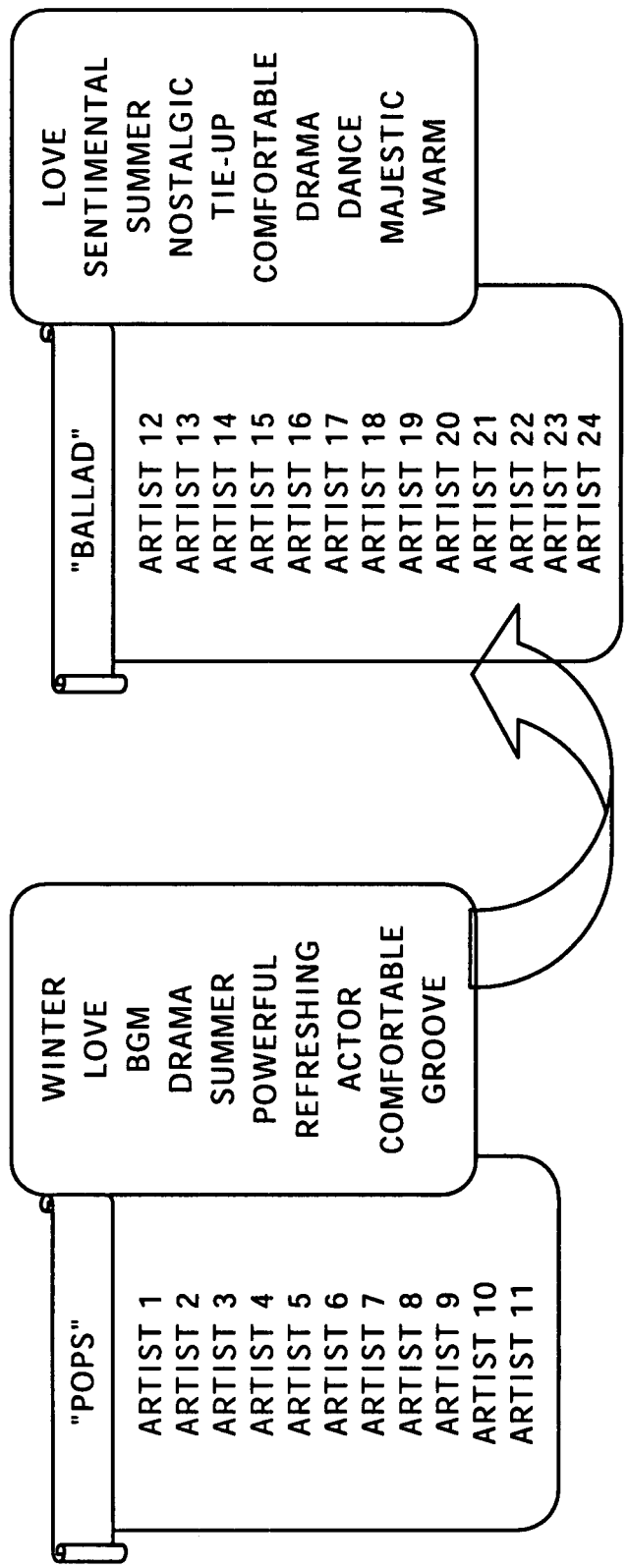
[FIG. 15]

It should be noted that, in the following description, it is assumed that, as shown in FIG. 15, ten pieces of metadata "winter," "love," "BGM," "drama," "summer," "powerful," "refreshing," "actor," "comfortable," and "groove" be extracted from the pops class as the important-metadata-by-class and ten pieces of metadata "love," "sentimental," "summer," "nostalgic," "tie-up," "comfortable," "drama," "dance," "majestic," and "warm" be extracted from the ballad class as the important-metadata-by-class.

In step S103, the combination extraction block 283 executes metadata combination extraction processing for each class in the same manner as that in step S3 of FIG. 4. The combination extraction block 283 stores the data indicative of an extracted metadata combination into the client storage block 223 and supplies the data to the content classification rule generation block 291.

It should be noted that the following description will be made on the assumption that the following ten metadata combinations have been extracted from the pops class.
"BGM"
"actor"
"winter" and "comfortable"
"love" and "comfortable"
"winter" and "groove"
"love" and "groove"
"summer" and "groove"
"refreshing" and "groove"
"drama" and "refreshing" and "comfortable"
"powerful" and "refreshing" and "comfortable"

It should be noted that the following description will be made on the assumption that the following 10 metadata combinations have been extracted from the ballad class.
"summer" and "nostalgic"
"nostalgic" and "tie-up"
"drama" and "majestic"
"comfortable" and "majestic"
"warm" and "majestic"
"love" and "summer" and "drama"
"sentimental" and "summer" and "drama"
"love" and "nostalgic" and "dance"
"sentimental" and "tie-up" and "drama"
"summer" and "tie-up" and "drama"

In step S104, the content classification rule generation block 291 generates content classification rules. To be more specific, first, the content classification rule generation block 291 generates, for each extracted metadata combination, content classification rules with the metadata combination extracted in step S103 being a condition part (or an if part) and the class in which that metadata combination is extracted being a decision part (or a then part). For example, the following ten content classification rules Rp1 through Rp10 are generated as the content classification rules with the pops class being the decision part (hereafter simply referred to also as the pops class content classification rules).

Rule Rp1: if ("BGM" true) then (class "pops")
Rule Rp2: if ("actor"=true) then "class="pops")
Rule Rp3: if ("winter"=true and "comfortable"=true) then (class="pops")
Rule Rp4: if ("love"=true and "comfortable"=true) then (class="pops")
Rule Rp5: if ("winter"=true and "groove"=true) then (class="pops")
Rule Rp6: if ("love"=true and "groove"=true) then (class="pops")
Rule Rp7: if ("summer"=true and "groove"=true) then (class="pops")
Rule Rp8: if ("refreshing"=true and "groove"=true) then (class="pops")
Rule Rp9: if ("drama"=true and "refreshing" true and "comfortable"=true) then (class="pops")
Rule Rp10: if ("powerful"=true and "refreshing"=true and "comfortable"=true) then (class "pops")

For example, if a certain piece of content has metadata "BGM," rule Rp1 is indicative that the class in which that content is classified is "pops."

Likewise, the following ten content classification rules Rb1 through Rb10 are generated as the content classification rules with the ballad class being the decision part (hereafter simply referred to also as the ballad class content classification rules).

Rule Rb1: if ("summer"=true and "nostalgic"=true) then (class="ballad")
Rule Rb2: if ("nostalgic"=true and "tie-up"=true) then "class="ballad")
Rule Rb3: if ("drama"=true and "majestic"=true) then (class="ballad")
Rule Rb4: if ("comfortable" true and "majestic"=true) then (class="ballad")
Rule Rb5: if ("warm"=true and "majestic"=true) then (class="ballad")
Rule Rb6: if ("love"=true and "summer"=true and "drama"=true) then (class="ballad")
Rule Rb7: if ("sentimental"=true and "summer"=true and "drama"=true) then (class="ballad")
Rule Rb8: if ("love"=true and "nostalgic"=true and "dance"=true) then (class="ballad")
Rule Rb9: if ("sentimental"=true and "tie-up"=true and "drama"=true) then (class="ballad")
Rule Rb10: if ("summer"=true and "tie-up"=true and "drama"=true) then (class="ballad")

It should be noted that, hereafter, the metadata combination indicated in the condition part of each content classification rule is simply referred to also as a metadata combination of each content classification rule. In addition, the class indicated in the decision part of each content classification class is simply referred to also as the class of content classification rule.

Next, the content classification rule generation block 291 computes the evaluation index of each content classification rule.

The following describes examples of evaluation index computation methods.

In a first method, as defined in equation (27) below, a total value of the weights of metadata included in metadata combinations of each content classification rule is used as an evaluation index.

$$EI = \Sigma \text{Weight}(W_i) \quad (27)$$

It should be noted that EI is indicative of an evaluation index, $W_i$ is indicative of the metadata included in the metadata combination of each content classification rule, and Weight($W_i$) is indicative of the weight of metadata $W_i$ in the class of content classification rule.

For example, in the case of rule Rp3, a value obtained by totaling the weight of metadata "winter" of class "pops" and the weight of metadata "comfortable" of class "pops" provides an evaluation index.

In the first method, as the number of metadata included in the metadata combination of each content classification rule increases or as the weight of the metadata included in the metadata combination of each content classification rule increases, the evaluation index gets higher. Namely, as the relation between the metadata combination of each content classification rule and the content belonging to the class of content classification rule gets deeper, in other words, as the degree in which the metadata combination of each content classification rule represents the feature of the content belonging to the class of content classification rule gets higher, the evaluation index gets higher. Still in other words, as the ratio of the content having the metadata including the metadata combination of each content classification rule in the class of content classification rule increases, the evaluation index gets higher.

In a second method, as shown in equation (28) below, the average value of the weights of the metadata included in the metadata combination of each content classification rule is used as an evaluation index.

$$EI = \{\Sigma \text{Weight}(W_i)\} \div Nc \quad (28)$$

It should be noted that Nc is indicative of the number of pieces of metadata included in the metadata combination of each content classification rule.

For example, in the case of rule Rp3, a value obtained by dividing, by two, a value obtained by totaling the weight of metadata "winter" in class "pops" and the weight of metadata "comfortable" in class "pops" provides an evaluation value.

In the second method, as the weight of the metadata included in the metadata combination of each content classification rule increases, the evaluation value increases. Namely, as the relation of each metadata included in the condition part of each content classification rule with the content belonging to the class of content classification rule gets deeper, in other words, in other words, as the degree in which each individual piece of metadata included in the condition part of each content classification rule represents the feature of the content belonging to the class of content classification rule gets higher, the evaluation index gets higher. Still in other words, as the ratio of the content having at least one piece of metadata among the pieces of metadata included in the metadata of each content classification rule increases, the evaluation index gets higher.

In a third method, as shown in equation (29) below, the ratio of content satisfying the condition part of each content classification rule in all pieces of content, in other words, the ratio of the content having the metadata included in the metadata combination of each content classification rule in all pieces of content, namely, the covering ratio, provides an evaluation index. It should be noted that all pieces of content denote the pieces of content classified into all classes in step S1.

$$EI=\text{Count(Condition)} \div N \qquad (29)$$

It should be noted that Count(Condition) denotes the number of pieces of content satisfying the condition part of each content classification rule and N denotes the total number of pieces of content.

For example, in the case of rule Rp3, of all pieces of content, the ratio of the content having metadata "winter" and metadata "comfortable" provides an evaluation index.

In the third method, of all pieces of content, as the ratio of the content satisfying the condition part of each content classification rule increases, the evaluation index gets higher.

In a fourth method, as shown in equation (30) below, of the content belonging to the class of content classification rule, the ratio of the content satisfying the condition part of each classification rule, namely, so-called reproducibility (Recall), provides an evaluation index.

$$EI=\text{Recall Count(Condition \& Decision)} \div \text{Count(Decision)} \qquad (30)$$

It should be noted that Count(Condition & Decision) denotes, of the content belonging to the class of content classification rule, the number of pieces of content satisfying the condition part of each content classification rule and Count(Decision) denotes the number of pieces of content belonging to the class of content classification rule.

For example, in the case of rule Rp3, of the content belonging to class "pops," the ratio of the content having metadata "winter" and metadata "comfortable" provides an evaluation index.

In the fourth method, as the ratio in which the content belonging to the class of content classification rule has the metadata including the metadata combination of each content classification rule increases, the evaluation index gets higher. Namely, as the relation of the metadata combination of each content classification rule with the content belonging to the class of content classification rule gets deeper, in other words, as the degree in which the metadata combination of each content classification rule represents the feature of the content belonging to the class of content classification rule gets higher, the evaluation index gets higher.

In a fifth method, as shown in equation (31) below, of the content satisfying the condition part of each content classification rule, the ratio of the content belonging to the class of content classification rule, so-called adaptability (Precision) provides an evaluation index.

$$EI=\text{Precision}=\text{Count(Condition \& Decision)} \div \text{Count(Condition)} \qquad (31)$$

For example, in the case of rule Rp3, of the content having metadata "winter" and metadata "comfortable," the ratio of the content belonging to class "pops" provides an evaluation index.

In the fifth method, as the ratio in which the content having the metadata including the metadata combination of each content classification rule belongs to the class of content classification rule gets higher, the evaluation index gets higher. Namely, as the relation of the metadata combination of each content classification rule with the content belonging to the class of content classification rule gets deeper, in other words, as the degree in which the metadata combination of each content classification rule represents the feature of the content belonging to the class of content classification rule gets higher, the evaluation index gets higher.

In a sixth method, as shown in equation (32) below, a harmonic average between the reproducibility (Recall) obtained by equation (3) and the adaptability (Precision) obtained by equation (31), namely, F value, provides an evaluation index.

$$EI=F=2 \div (1 \div \text{Recall} + 1 \div \text{Precision}) \qquad (32)$$

In the sixth method, as the set of the content having metadata including the metadata combination of each content classification rule and the class of content classification rule get nearer each other, the evaluation index gets higher.

In a seventh method, as shown in equation (33) below, the condition part and the decision part of each content classification rule are each grasped as one event and the relativity of the probability of the occurrence of the event of the condition part and the probability of the occurrence of the event of decision part provide an evaluation index.

$$EI=\text{Count(Condition \& Decision)} \div \text{Count(Condition)} \times \text{Count(Decision)} \div N \qquad (33)$$

It should be noted that equation (33) above is derived as follows.

$$\text{Prob(Condition)}=\text{Count(Condition)} \div N \qquad (34)$$

$$\text{Prob(Decision)}=\text{Count(Decision)} \div N \qquad (35)$$

$$\text{Prob(Condition \& Decision)}=\text{Count(Condition \& Decision)} \div N \qquad (36)$$

It should be noted that Prob(Condition) is indicative of the probability of the occurrence of the condition part of content classification rule, Prob(Decision) is indicative of the probability of the occurrence of the decision part of content classification rule, and Prob(Condition & Decision) is indicative of the probability of the concurrent occurrence of both the event of condition part and the event of decision part of content classification rule.

From equations (34) through (36), relativity R of the probability of the occurrence of the event of the condition part and the probability of the occurrence of the event of the decision part of content classification rule is obtained from equation (37) below.

$$R = \text{Prob(Condition \& Decision)} - \text{Prob(Condition)} \times \text{Prob(Decision)} = \text{Count(Condition \& Decision)} \div N - \text{Count(Condition)} \times \text{Count(Decision)} \div N^2 \quad (37)$$

Since the total number of pieces of content N is a value common to all content classification rules, equation (33) is derived by multiplying relativity R by the total number of pieces of content N.

For example, in the case of rule Rp3, a value obtained by subtracting the number of pieces of content having metadata "winter" and metadata "comfortable"×the number of pieces of content belonging to class "pops"÷N from the number of pieces of content having metadata "winter" and metadata "comfortable" provides an evaluation index.

In the seventh method, as the relativity between the probability in which the content has the metadata including the metadata combination of content classification rule and the probability in which the content belongs to the class of content classification rule gets higher, the evaluation index gets higher. Namely, as the relation of the event in which the content has the metadata including the metadata combination of content classification rule with the event in which the content belongs to the class of content classification rule gets deeper, the evaluation index gets higher. If the event of the condition part and the event of the decision part of content classification rule are independent of each other, equation (38) below is established, so that the evaluation value becomes the minimum value, namely, zero.

$$\text{Prob(Condition \& Decision)} = \text{Prob(Condition)} \times \text{Prob(Decision)} \quad (38)$$

Thus, an evaluation index is indicative of the degree in which the metadata or metadata combination included in the condition part of each content classification rule appears in the metadata of the content belonging to the class of decision part. Especially, the evaluation indexes computed by use of the first, the second, and the fourth through seventh methods are representative of the degree of relation between the metadata combination included in the condition part of each content classification rule and the content belonging to the class of decision part. Namely, the evaluation indexes computed by use of the first, the second, and the fourth through seventh methods are representative of the degree in which the combination of metadata included in the condition part of each content classification rule is representative of the feature of the content belonging to the class of decision part.

The following describes an example in which the above-mentioned fifth method is used for the computation of an evaluation index, namely, an evaluation index is F value. In the following description, evaluation index EI of each content classification rule is assumed to be the following.

[Content Classification Block 281]

EI(Rp1)=0.429
EI(Rp2)=0.240
EI(Rp3)=0.167
EI(Rp4)=0.333
EI(Rp5)=0.167
EI(Rp6)=0.167
EI(Rp7)=0.167
EI(Rp8)=0.167
EI(Rp9)=0.167
EI(Rb10)=0.167
EI(Rb1)=0.267
EI(Rb2)=0.267
EI(Rb3)=0.267
EI(Rb4)=0.333
EI(Rb5)=0.143
EI(Rb6)=0.267
EI(Rb7)=0.143
EI(Rb8)=0.143
EI(Rb9)=0.143
EI(Rb10)=0.143

The content classification rule generation block stores the information about the generated content classification rules and the information about the evaluation index of each content classification rule into the client storage block 223 and supplies these pieces of information to the content automatic classification block 292.

In step S105, the content automatic classification block 292 sets the content to be automatically classified. To be more specific, if the user selects, through the user input block 221, one or more pieces of information (for example, music or movie newly purchased by the user or a program newly recorded by the user) as the content to be automatically classified from among the pieces of content stored in the client storage block 223, the user input block 221 supplies the information indicative of the user-selected content to the content automatic classification block 292. The content automatic classification block 292 sets the received user-selected content for automatic classification.

If, for example, the metadata associated with newly released content (for example, newly released movie, program, or music) or the metadata associated with the recommended content determined by some recommendation algorithm is supplied from the server storage block 251 to the client storage block 223, the client storage block 223 stores the received metadata and supplies the information indicative of the newly released or recommended content to the content automatic classification block 292. The content automatic classification block 292 sets the received newly released or recommended content for automatic classification.

In step S106, the content automatic classification block 292 automatically classifies the content. To be more specific, on the basis of the content classification rule, the content automatic classification block 292 classes each piece of content set in step S105 into a class and supplies the information indicative of a result of the classification to the classification result presentation block 293.

For example, the content automatic classification block 292 extracts, for each piece of content subject to automatic classification, the content classification rule (hereafter also referred to as content-adaptive content classification rule) with the metadata combination of the condition part included in the metadata combination of that content. Namely, for each piece of content subject to automatic classification, the content automatic classification block 292 extracts the content classification rule that is adapted to that content the content automatic classification block 292 classifies the extracted content classification rules into the class of decision part and adds up the numbers. The content automatic classification block 292 classifies that content into the class in which the number of pieces of adapted content becomes a maximum value.

For example, in the case of content X having seven pieces of metadata "BGM," "love," "summer," "groove," "comfortable," "nostalgic," and "dance," content X is adaptive to five content classification rules Rp1, Rp4, Rp7, Rb1, and Rb8. When the number of adapted content classification rules are added up for each class of decision part, the number of content classification rules with the decision part being "pops" is three and the number of content classification rules with the decision part being "ballad" is two. Therefore, in this case, the number of content classification rules with the decision part being "pops" is the highest, so that content X is classified as class "pops."

It is also practicable that, for each piece of content subject to automatic classification, the content be classified into the class of the content classification rule with the evaluation index being the highest among the adaptive content classification rules, for example.

In the above-mentioned content X, for example, the evaluation indexes of the content classification rules to which content X is adapted are as follows.

EI(Rp1)=0.429
EI(Rp4)=0.333
EI(Rp7)=0.167
EI(Rb1)=0.267
EI(Rb8)=0.143

Therefore, in this case, content X is classified into class "pops" of the decision part of content classification rule Rp1 with the evaluation index being the highest, namely, 0.429.

Further, it is practicable that, for each piece of content subject to automatic classification, the evaluation indexes of adaptive content classification rules be added up for the class of decision part, thereby classifying that content to the class with the total number of evaluation indexes being the highest, for example.

For example, in the case of content X, the evaluation indexes of the content classification rules to which content X is adapted are added up for each class as follows.

$$\Sigma EI(Rp)=EI(Rp1)+EI(Rp4)+EI(Rp7)=0.929 \qquad (39)$$

$$\Sigma EI(Rb)=EI(Rb1)+EI(Rp8)=0.410 \qquad (40)$$

It should be noted that $\Sigma EI(Rp)$ denotes the total value of the evaluation indexes of the content classification rules with the decision part being class "pops" among the content classification rules to which content X is adapted. $\Sigma EI(Rb)$ denotes the total value of the evaluation indexes of the content classification rules with the decision part being "ballad" among the content classification rules to which content X is adapted.

Therefore, in this case, content X is classified into class "pops" in which the total value of evaluation indexes is the highest.

It is also practicable that, for each piece of content subject to automatic classification, content X be classified into the class in which the average value of the evaluation indexes of the adaptive content classification rules is the highest, for example.

For example, in the above-mentioned case of content X, the average value for each class of the decision part of the evaluation indexes of the content classification rules to which content X is adapted is as follows.

$$EIav(Rp)=\Sigma EI(Rp) \div 3=0.929 \div 3=0.309 \qquad (41)$$

$$EIav(Rb)=\Sigma EI(Rb) \div 2=0.410 \div 2=0.205 \qquad (42)$$

It should be noted that EIav(Rp) denotes the average value of the evaluation indexes of the content classification rules with the decision part being class "pops" among the content classification rules to which content X is adapted. EIav(Rp) denotes the average value of the evaluation indexes of the content classification rules with the decision part being class "ballad" among the content classification rules to which content X is adapted.

Therefore, in this case content X is classified into class "pops" in which the average value of evaluation indexes is the highest.

It is also practicable that, instead of classifying each piece of content into one class, each piece of content be classified into one or more classes and the adaptability in which each particular piece of content is adapted to a particular class be set.

For example, for each piece of content subject to automatic classification, the content may be classified into all classes included in the decision part of the adapted content classification rules or the content may be classified into all classes in which the total value of evaluation indexes, the average value of evaluation indexes, or the evaluation index in the class is higher than a predetermined threshold value. Also, for example, for each class in which content is classified, the number of content classification rules with the decision part being that class among the adapted content classification rules or the total value, average value, or maximum value of the evaluation indexes of the content specification rules with the decision part being that class among the adapted content classification rules may be set as the adaptability.

In the above-mentioned case of content X, for example, content X may be classified into both classes "pops" and "ballad" included in the decision part of each adapted content classification rule, 0.929, the total value of the evaluation indexes of class "pops" may be set as the adaptability for class "pops" of content X, and 0.410, the total value of the evaluation indexes of class "ballad" may be set as the adaptability for class "ballad" of content X.

In step S107, the classification result presentation block 293 presents a result of the automatic classification. To be more specific, the classification result presentation block 293 controls the client output block 224 to present a result of the automatic classification of the content executed in step S106 to the user.

For example, the classification result presentation block 293 controls the client output block 224 to present the following information.

Content X: "pops" keyword: BGM, love, groove, conformable

Consequently, the user knows that content X has been classified into group "pops" on the basis of the metadata (in this case, the metadata presented to the user as keywords) "BGM," "love," "groove," and "comfortable."

It is also practicable that, before actually classifying content X, this information be presented to the user, thereby recommending the classification of content X to group "pops" to the user, for example.

Also, it is practicable that, of the metadata combinations of each piece of content, the feature of the content may be presented to the user on the basis of the metadata included in the metadata combination matching the condition part of each content classification rule and the class of the decision part of the content classification rule matching the condition part. For example, the feature of the content may be presented to the user on the basis of the class name in which the content has been classified and the metadata used for the classification of the content.

For example, in the above-mentioned case of content X, the classification result presentation block 293 controls the client output block 224 to display the following information as the feature of content X.

Content X: BGM-like "pops," nostalgic summer "ballad"

Consequently, the user can easily and specifically know the feature of content X. It should be noted that this example shows that the adaptability is set to classify content into one or more classes.

In step S108, the content automatic classification block 292 determines whether to change the content to be automatically classified. For example, if the user enters the information for specifying the change of the content subject to automatic classification through the user input block 221 to automatically classify another piece of content, then the user input block 221 supplies the entered information to the content automatic classification block 292. Receiving this information, the content automatic classification block 292 determines the change of the content to be automatically classified, upon which the procedure returns to step S105. Then, the processing of steps S105 through S108 is repeated until the change of the content subject to automatic classification is not specified in step S108, thereby automatically classifying the content specified by the user.

If the change of the content subject to automatic classification is not specified in step S108, then the procedure goes to step S109.

In step S109, the content classification block 281 determines whether to change content classification viewpoints in the manner as the processing of step S6 shown in FIG. 4. Of the change of content classification viewpoints is specified, the procedure returns to step S101 to repeat the processing of steps S101 through S109 until the change of content classification viewpoints is not specified in step S109. Namely, the content is automatically classified on the basis of a new viewpoint (the favor/disfavor viewpoint, for example).

If the change of content classification viewpoints is not specified in step S109, then the content classification processing ends.

Thus, on the basis of a user viewpoint dependent of metadata, on the favor/disfavor or folder viewpoint, of example, each piece of content can be automatically classified without setting any metadata condition necessary the content classification by the user.

Figure 16:
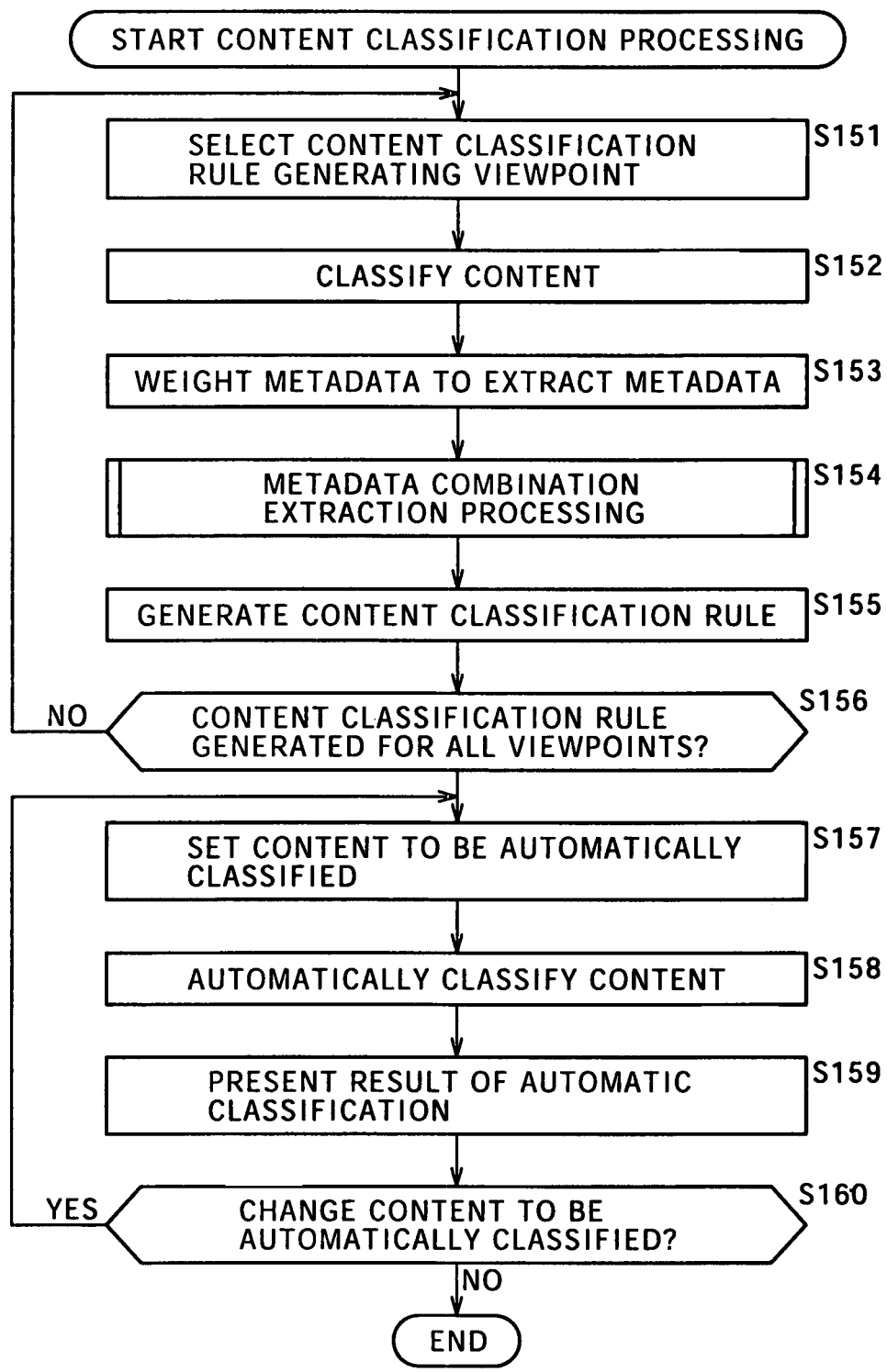
[FIG. 16]

The following describes a second embodiment of content classification processing to be executed by the information processing system 201 with reference to the flowchart shown in FIG. 16. It should be noted that this processing starts when the user enters a command for starting content classification processing through the user input block 221, for example.

In step S151, the content classification block 281 selects a viewpoint for generating content classification rules. To be more specific, the content classification block 281 selects one of the viewpoints by which no content classification rule has been generated. For example, in the above-mentioned example shown in FIG. 14, one of the viewpoints by which no content classification rule has been generated, namely, the two viewpoints of user favor/disfavor and folder in which content is stored, is selected.

Figure 13:
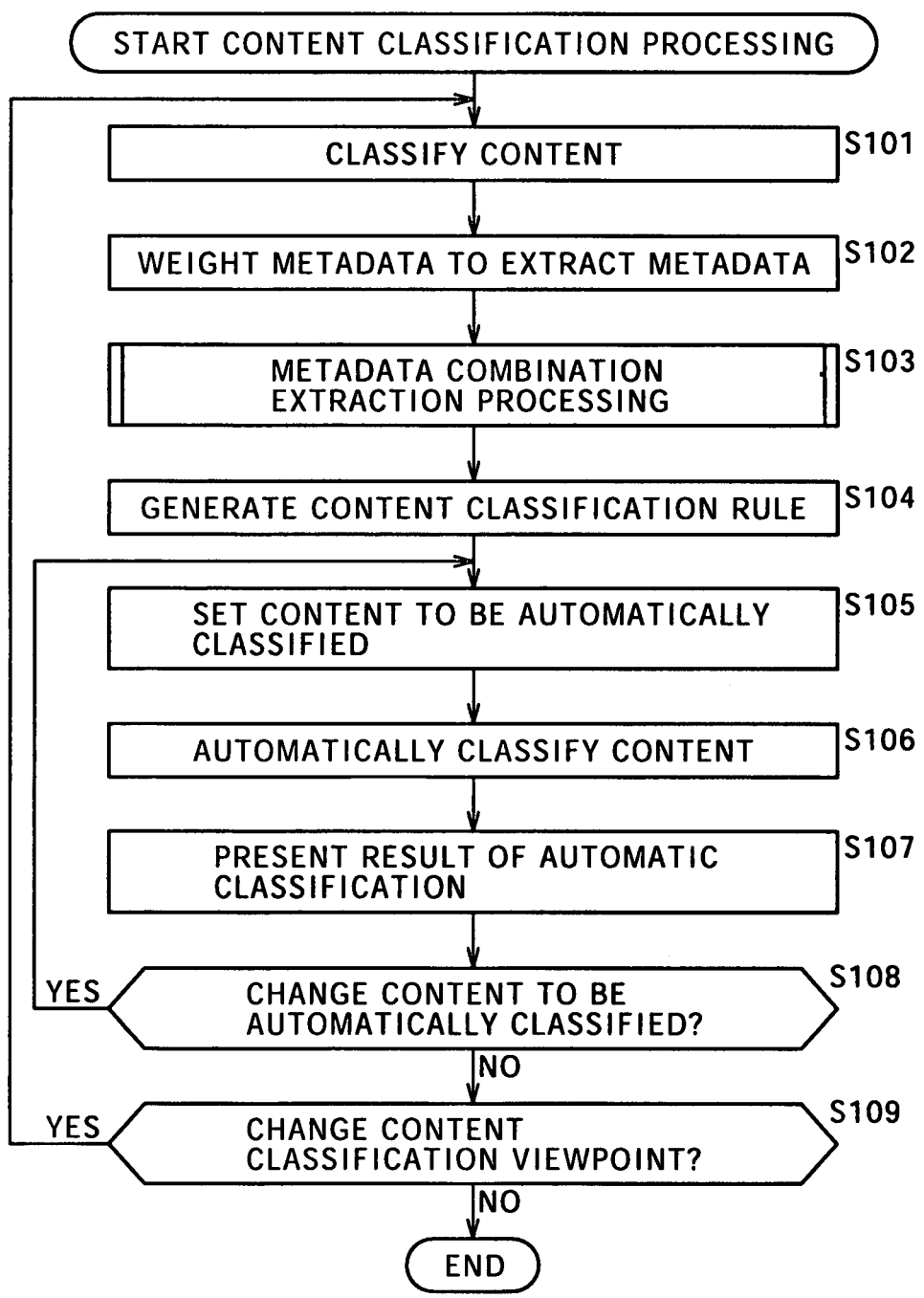
[FIG. 13]

In step S152, the content classification block 281 classifies the content into a plurality of classes on the basis of the viewpoint selected in step S151 in the same manner as the above-mentioned step S101 shown in FIG. 13 and supplies the information about the resultant content classes to the metadata extraction block 282.

The processing of steps S153 through S155 is the same as the processing of step S102 through S104 shown in FIG. 13 and therefore the description thereof will be skipped for brevity. As described above, these processing operations generate the content classification rules for the viewpoint selected in step S151 and compute the evaluation index for each content classification rule.

In step S156, the content classification block 281 determines whether the content classification rules have been generated for all viewpoints. If there is any viewpoints for which the content classification rule has not been generated, the procedure returns to step S151 to repeat the processing of steps S151 through S156 until the content classification rules have been generated for all viewpoints in step S156. Namely, when the content classification rules have been generated for all viewpoints, the evaluation index for each content specification rule is computed.

If the content specification rules have been generated for all viewpoints in step S156, then the procedure goes to step S157.

In step S157, the content to be automatically classified is set in the same manner as the above-mentioned processing of step S105 shown in FIG. 13.

In step S158, the content automatic classification block 292 automatically classifies the content. To be more specific, the for all pieces of content subject to automatic classification, the content automatic classification block 292 extracts the content classification rule adapted to each piece of content from among all content classification rules. The content automatic classification block 292 adds up the evaluation values of the extracted content classification rules for each class of the decision part.

Next, of each viewpoint, the content automatic classification block 292 computes a difference in evaluation index between the class in which the total of evaluation index values is the highest and the class in which the total of evaluation index values is the next to the highest, thereby selecting the viewpoint in which the computed difference is the highest, namely, the viewpoint in which the feature of that content appears most conspicuously. Then, of the classes in the selected viewpoint, the content automatic classification block 292 classifies that content into the class in which the total value of evaluation indexes is the highest.

It is also practicable to classify each piece of content subject to automatic classification into the class in which the total value, average value, or maximum value of the evaluation indexes of the adapted content classification rules regardless of viewpoint.

Further, it is practicable to classify each piece of content subject to automatic classification into all classes in which the total value or average value of the evaluation indexes of the adapted content classification rules, or the maximum value of the evaluation indexes in each class is higher than a predetermined threshold value and set the above-mentioned adaptability. In this case, one piece of content may belong to a plurality of classes within one viewpoint or may be classified into a class of a plurality of viewpoints.

The content automatic classification block 292 supplies the information about the result of the classification of each piece of content to the classification result presentation block 293.

In step S159, the result of the automatic classification is presented to the user in the same manner as the processing of step S108 shown in FIG. 13. In step S160, it is determined whether to change the content to be automatically classified in the same manner as the processing S109 shown in FIG. 13. If the content to be automatically classified is to be changed, then the procedure returns to step S157 to repeat the processing steps S157 through S160 until the content subject to automatic classification is not changed.

If the viewpoints for content classification are not changed in step S160, then the content classification processing ends.

Thus, the content can be automatically classified on the basis of a plurality of viewpoints at a time.

As described above, if, of all data combinations obtained by taking out one or more pieces of data related with each of the elements belonging to the class subject to feature extraction as the feature of the class in which a plurality of elements related with the data representative of the feature of each element are classified, a data combination not existing in any data combinations obtained by taking out one or more pieces of data related with each element belonging to another class is extracted, the feature of the class with a plurality of elements classified can be extracted. Further, the feature of the class with a plurality of elements classified can be extracted easily and correctly.

It should be noted that the description made above uses examples in which the number of viewpoints for content classification is one; however, it is also practicable to use two or more viewpoints in combination. For example, the example shown in FIG. 5 allows the combination of the user favor/disfavor viewpoint and the play list selected viewpoint to easily extract a metadata combination indicative of the feature of the class to which the content favored by the user and not selected in the play list, for example.

Also, for an example in which a plurality of viewpoints are combined, multi-layer directories and bookmarks for managing content can be used as content classification viewpoints. Use of these classification viewpoints allows the extraction of the metadata combination indicative of feature of the granularity or detail of the content classification executed by the user (directories or bookmarks for example).

Further, it is practicable to extract a metadata combination indicative of the feature of the class in which the classification is made by a combination of two viewpoints of directory to which the user belongs and user favor/disfavor.

It should be noted that, because the increase in the number of viewpoints for content classification will not affect the processing to be executed after the classification of the content into a plurality of classes, the algorithm according to the present invention described before with reference to FIGS. 4, 7, 10, 13, or can be applied without change. In addition, a plurality of combinations of content classification viewpoints allows the extraction of a metadata combination that represents user preferences for example more precisely.

If the number of metadata types is small or the processing is executed on a high-performance computer, for example, the important-metadata-by-class may not be extracted. If a metadata combination is extracted by use of all pieces of metadata, the possibility becomes higher of the extraction of a metadata combination that represents the feature of class more correctly.

The description made above uses examples in which a metadata combination related with content is extracted; however, the present invention is also applicable to the classification of a plurality of elements to which data representative of the feature of each element is related into a plurality of classes to extract the feature of each class on the basis of the data of each element, such as extracting the feature of each class of a particular school on the basis of the data (grades, physical height and weight, for example) associated with students of each class and extracting the features of a plurality of manufactures producing similar products on the basis of the data (price, performance, shape, and color, for example), for example.

As described above, the present invention is applicable to apparatuses and systems such as recommendation systems, personal computers, mobile phones, PDA (Personal Digital Assistant), and various AV (Audio Visual) equipment or software for recommending content and products to users and extracting the features of classes in which content and products are classified, for example.

For example, application of the present invention to apparatuses having TV program recommendation capabilities of learning user's viewing pattern allows, on the basis of a metadata combination of extracted talent A and variety program for example, the recommendation of a variety program in which user favorite talent A performs, while not recommending any song programs in which user's disfavored talent A performs, thus recommending programs to the user on the basis of user's precise preference and presenting the reason for the recommendation, which enhances the user acceptability of recommended programs.

In addition, application of the present invention to the music file browsing and editing software that is executed on a personal computer operatively associated with a music player allows the creation of play lists and the presentation of metadata combinations indicative of the feature of each play list to the user, thereby making file browsing and editing operations user-friendly and enjoyable.

Further, the present invention is applicable to apparatuses and systems or software that classify various kinds of content for management. For example, application of the second embodiment of the present invention to electronic mail software allows the automatic classification of mail on the basis of the contents of mail without setting mail sender, subject, and header information as classification conditions unlike the conventional practice.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Figure 17:
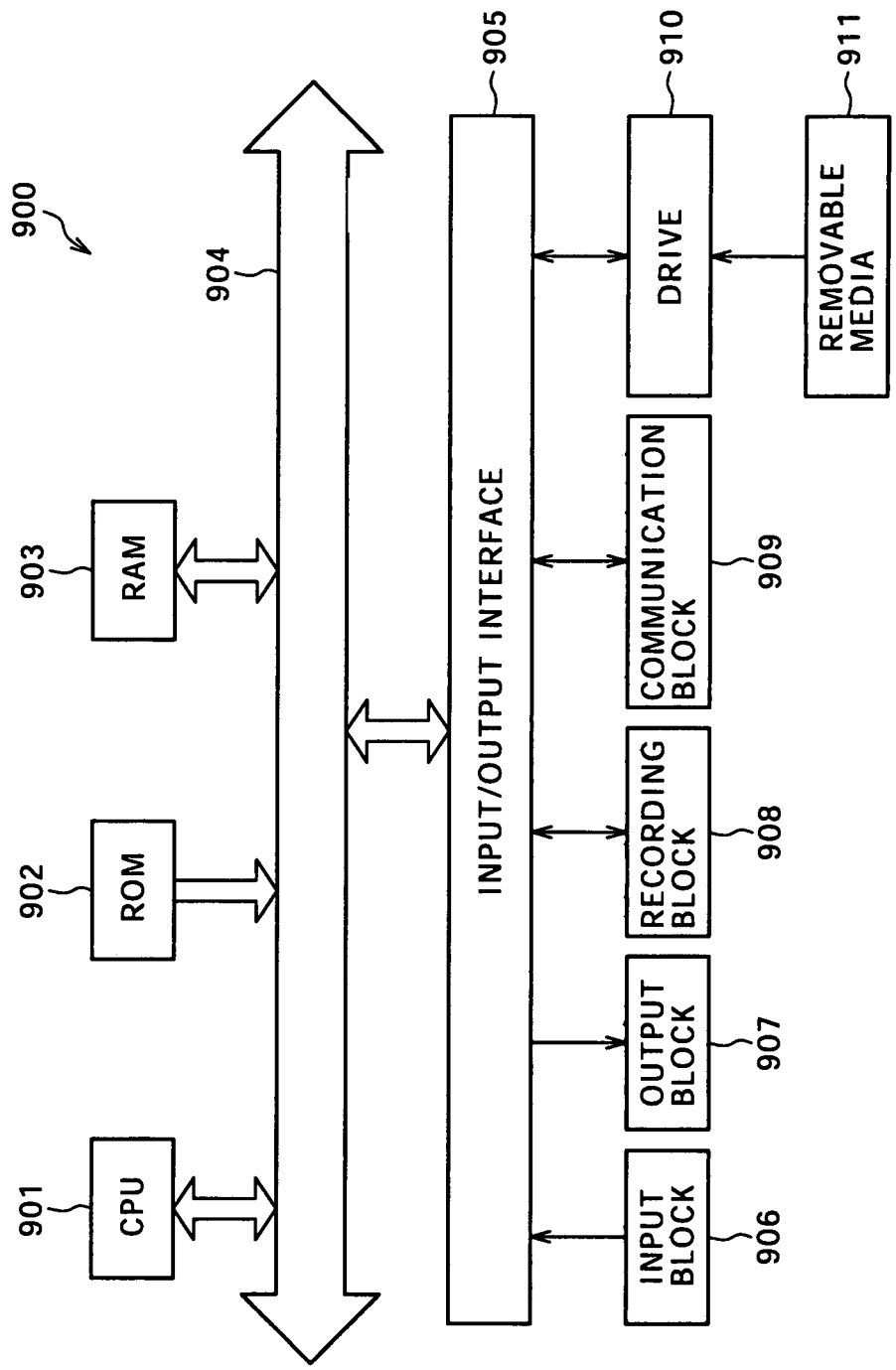
[FIG. 17]

FIG. 17 is a block diagram illustrating an exemplary configuration of a personal computer that executes the above-mentioned sequence of processing by means of software programs. A CPU (Central Processing Unit) 901 executes various kinds of processing as instructed by programs stored in a ROM (Read Only Memory) or a recording block 908. A RAM (Random Access Memory) stores programs to be executed by the CPU 901 and data necessary for the execution, from time to time. These CPU 901, ROM 902, and RAM 903 are interconnected by a bus 904.

The CPU 901 is also connected to an input/output interface 905 via the bus 904. The input/output interface is connected to an input block 906 made up of a keyboard, a mouse, and a microphone, for example, and an output block 907 made up of a display and a loudspeaker, for example. The CPU 901 executes various kinds of processing operations in response to commands entered through the input block 906. The CPU 901 outputs the result of processing to the output block 907.

A recording block 908 connected to the input/output interface 905 stores programs to be executed by the CPU and various kinds of data. A communications block 909 communicates with external devices through networks such the Internet and a local area network.

It is also practicable to get programs through the communications block 909 and store these programs into the recording block 908.

A drive 910 connected to the input/output interface drives a removable media 911, such as a magnetic disc, an optical disc, a magneto-optical disc, or a semiconductor loaded on the drive 910 to get programs and data from the loaded removable media. The obtained programs and data are transferred to the recording block to be stored therein as required.

As shown in FIG. 17, program recording media for storing programs that are installed on a computer for execution is made up of the removable media 911 that are package media made up of a magnetic disc (including a flexible disc), an optical disc (including CD-ROM (Compact Disc-Read Only Memory), a DVD (Digital Versatile Disc), a magneto-optical disc, or a semiconductor memory, the ROM 902 in which programs are temporarily or permanently stored, or a hard disc drive that forms the recording block 908. Storing of programs into program recording media is executed by use of wired or wireless communication media, such as a LAN, the Internet, or digital satellite broadcasting, via the communications block 909 that provides an interface, such as a router and a modem, as required.

It should be noted herein that the steps for describing each program recorded in recording media include not only the processing operations which are sequentially executed in a time-dependent manner but also the processing operations which are executed concurrently or discretely.

It should also be noted that term "system" as used herein denotes an entire apparatus configured by a plurality of component units.

While preferred embodiments of the present invention have been described using specific terms, such description is for illustrative purpose only, and it is to be understood that changes and variations may be made without departing from the spirit or scope of the following claims.

The invention claimed is:

1. An information processing apparatus comprising:
    feature extraction means for extracting a feature of a first class,
        wherein the first class comprises a first plurality of elements related to first data that is indicative of a feature of each of the first plurality of elements,
        wherein a second class comprises a second plurality of elements related to second data indicative of a feature of each of the second plurality of elements, and
        wherein the extracted feature of the first class is obtained by:
            determining a first set of data combinations obtained by taking out one or more pieces of the first data related to the first plurality of elements,
            determining a second set of data combinations obtained by taking out one or more pieces of the second data related to the second plurality of elements, and
            identifying a combination of data present in the first set of data combinations but absent from the second set of data combinations; and
    class classification means for classifying elements of the first plurality of elements into a class on the basis of an evaluation index indicative of a degree of relation between the identified combination of data and an element belonging to an extraction class from which the combination of data is identified.

2. The information processing apparatus according to claim 1, further comprising:
    feature presentation control means for controlling presentation of a feature of the first class, so as to present one or more combinations of the extracted data to a user as a feature of the class.

3. The information processing apparatus according to claim 1, further comprising:
    data extraction means for extracting, on the basis of a difference between a first degree of association between an element belonging to the first class and the first data, and a second degree of association between an element belonging to the second class and the second data, a second combination of data more clearly representative of a feature of the element belonging to the first class before the identification of the combination of data, said feature extraction means extracting the second combination of data extracted by said data extraction means.

4. The information processing apparatus according to claim 3, wherein the data extraction means obtains a weight of the first data in the first class on the basis of the first degree of association, the second degree of association, and the difference there between, thereby extracting a predetermined number of pieces of the first data of the first class with a weight value that is higher than a predetermined threshold value.

5. The information processing apparatus according to claim 4, wherein the weight of the first data comprises any one of tfidf (term frequency with inverse document frequency), mutual information, information gain ratio, $X^2$ value, and log likelihood ratio.

6. The information processing apparatus according to claim 1, further comprising:
    element extraction means for extracting, on the basis of the identified combination of data, from among elements belonging to a second group different from a first group configured by the first plurality of elements, an element associated with the plurality of elements belonging to the class from which the combination of data has been identified.

7. The information processing apparatus according to claim 6, wherein the element extraction means extracts the element belonging to the second group associated with data that includes the identified combination of data.

8. The information processing apparatus according to claim 6, further comprising:
    element presentation control means for controlling the presentation of the extracted element to a user.

9. The information processing apparatus according to claim 8, wherein the element presentation control means controls the presentation so as to further present the combination of data used for the extraction of the element as a reason for the extraction of the element.

10. The information processing apparatus according to claim 1, wherein said first plurality of elements are content and the first data is metadata associated with the content.

11. The information processing apparatus according to claim 1, further comprising:
    evaluation index computation means for computing the evaluation index.

12. The information processing apparatus according to claim 11, wherein said evaluation index computation means computes an F value that is a harmonic average value between:
    a reproducibility that is a ratio of the plurality of elements associated with data including the combination of data among the plurality of elements belonging to the extraction class, and
    an adaptability that is a ratio of the plurality of elements belonging to the extraction class among the plurality of elements associated with data including the combination of data.

13. The information processing apparatus according to claim 1, further comprising:
    class classification means for classifying, of the combination of the data associated with elements of the first plurality of elements, elements into a class on the basis of a number matching the identified combination of data.

14. The information processing apparatus according to claim 1, further comprising:
    feature presentation means for presenting, of a combination of data associated with an element subject to feature presentation, a feature of the element subject to feature presentation, on the basis of data included in the combination of data associated with the element subject to feature presentation matching the identified combination of data, and the class from which the matching combination of data has been extracted.

15. A feature extraction method comprising:
extracting a feature of a first class,
    wherein the first class comprises a first plurality of elements associated with first data representative of a feature of each of the first plurality of elements,
    wherein a second class comprises a second plurality of elements associated with second data representative of a feature of each of the second plurality of elements, and
    wherein the extracted feature of the first class is obtained by:
        determining a first set of data combinations obtained by taking out one or more pieces of the first data associated with the first plurality of elements,
        determining a second set of data combinations obtained by taking out one or more pieces of the second data related to the second plurality of elements, and
        identifying a combination of data present in the first set of data combinations but absent from the second set of data combinations; and
classifying elements of the first plurality of elements into a class on the basis of an evaluation index indicative of a degree of relation between the identified combination of data and an element belonging to an extraction class from which the combination of data is identified.

16. A non-transitory computer-readable medium comprising program code, the program code being operable, when executed by a computer system, to cause the computer system to perform steps comprising:
extracting a feature of a first class,
    wherein the first class comprises a first plurality of elements associated with first data representative of a feature of each of the first plurality of elements,
    wherein a second class comprises a second plurality of elements associated with second data representative of a feature of each of the second plurality of elements, and
    wherein the extracted feature of the first class is obtained by:
        determining a first set of data combinations obtained by taking out one or more pieces of the first data related to the first plurality of elements,
        determining a second set of data combinations obtained by taking out one or more pieces of the second data related to the second plurality of elements, and
        identifying a combination of data present in the first set of data combinations but absent from the second set of data combinations: and
classifying elements of the first plurality of elements into a class on the basis of an evaluation index indicative of a degree of relation between the identified combination of data and an element belonging to an extraction class from which the combination of data is identified.

* * * * *